United States Patent
Hinks et al.

[15] 3,696,655
[45] Oct. 10, 1972

[54] APPARATUS FOR MAKING BLADES

[72] Inventors: William L. Hinks; Harry L. Hosterman, both of Akron, Ohio

[73] Assignee: The Goodyear Tire & Rubber Company, Akron, Ohio

[22] Filed: Feb. 16, 1971

[21] Appl. No.: 115,266

Related U.S. Application Data

[62] Division of Ser. No. 744,120, July 11, 1968, Pat. No. 3,581,535.

[52] U.S. Cl. .................72/321, 72/294, 72/311, 72/388, 72/312, 72/7
[51] Int. Cl. ......B21d 11/04, B21b 37/14, B21d 9/05
[58] Field of Search........72/319, 320, 321, 322, 323, 72/388, 296, 306, 311, 294, 310, 7, 312

[56] References Cited

UNITED STATES PATENTS

| | | | |
|---|---|---|---|
| 3,581,535 | 6/1971 | Hinks | 72/7 |
| 3,420,279 | 1/1969 | Tuit | 72/320 |
| 2,915,106 | 12/1959 | Green | 72/321 |
| 3,058,512 | 10/1962 | Chebuhar | 72/321 |
| 1,006,861 | 10/1911 | McCabe | 72/321 |
| 3,251,208 | 5/1966 | Mittermaier | 72/319 |
| 393,583 | 11/1888 | Robinson | 72/319 |
| 3,145,756 | 8/1964 | Hill | 72/7 |

*Primary Examiner*—Charles W. Lanham
*Assistant Examiner*—Michael J. Keenan
*Attorney*—F. W. Brunner and R. S. Washburn

[57] ABSTRACT

Method and apparatus for making blades for use in tire molds by piercing, notching, bending or otherwise altering shape of a free end of strip material by successively positioning the free end and a plurality of shape altering tools in operative engagement and cutting off a so-formed blade from the free end. Apparatus includes an automated machine tool having five axes of control and means for storing and for communicating command signals to each axis. Successive different blade configurations are made without revision of shaping tools. The strip, held by jaws, may be bent up or down in successive bends by a rotating bending device. A rotatable punch and die set is included.

9 Claims, 36 Drawing Figures

INVENTORS
WILLIAM L. HINKS
HARRY L. HOSTERMAN

INVENTORS
WILLIAM L. HINKS
HARRY L. HOSTERMAN
BY:
AGENT

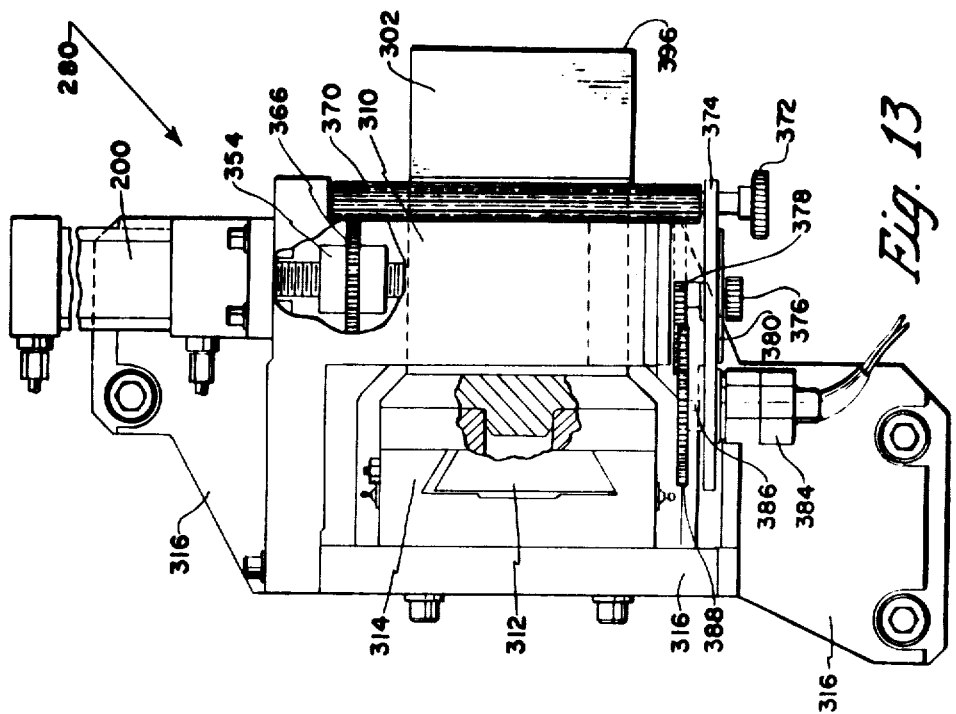
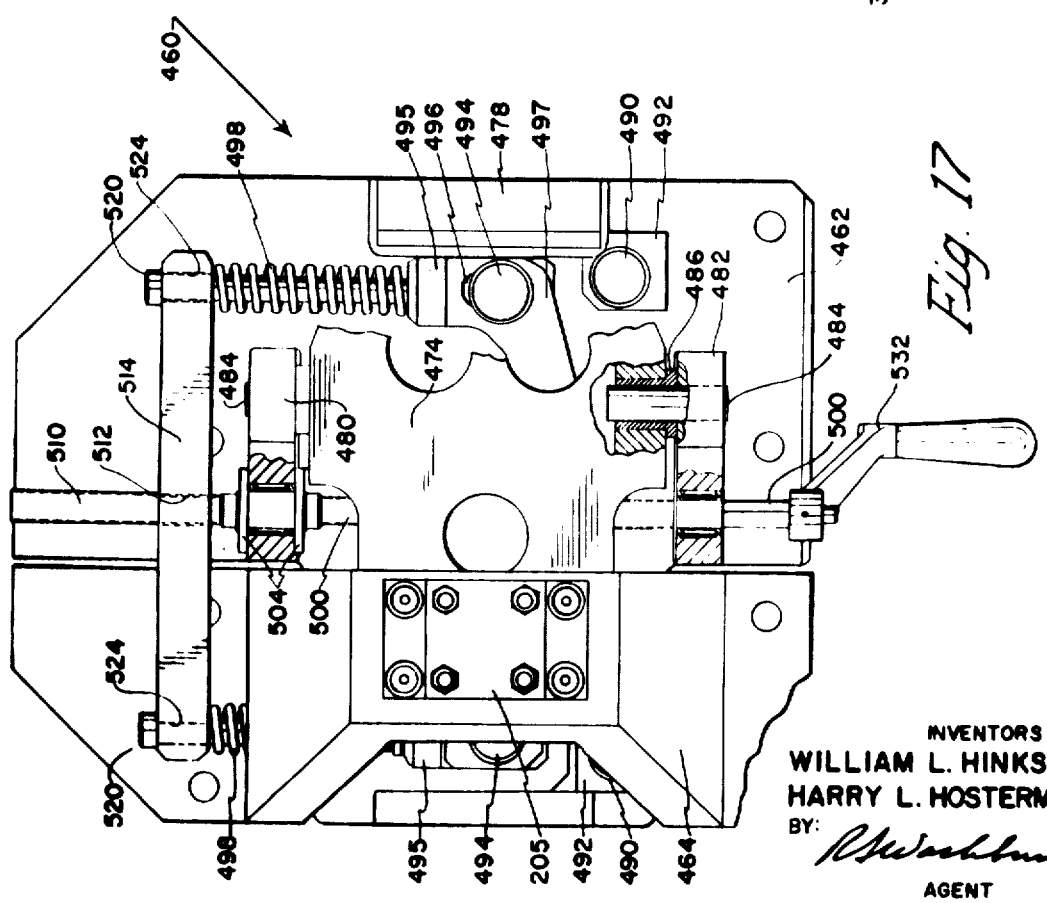

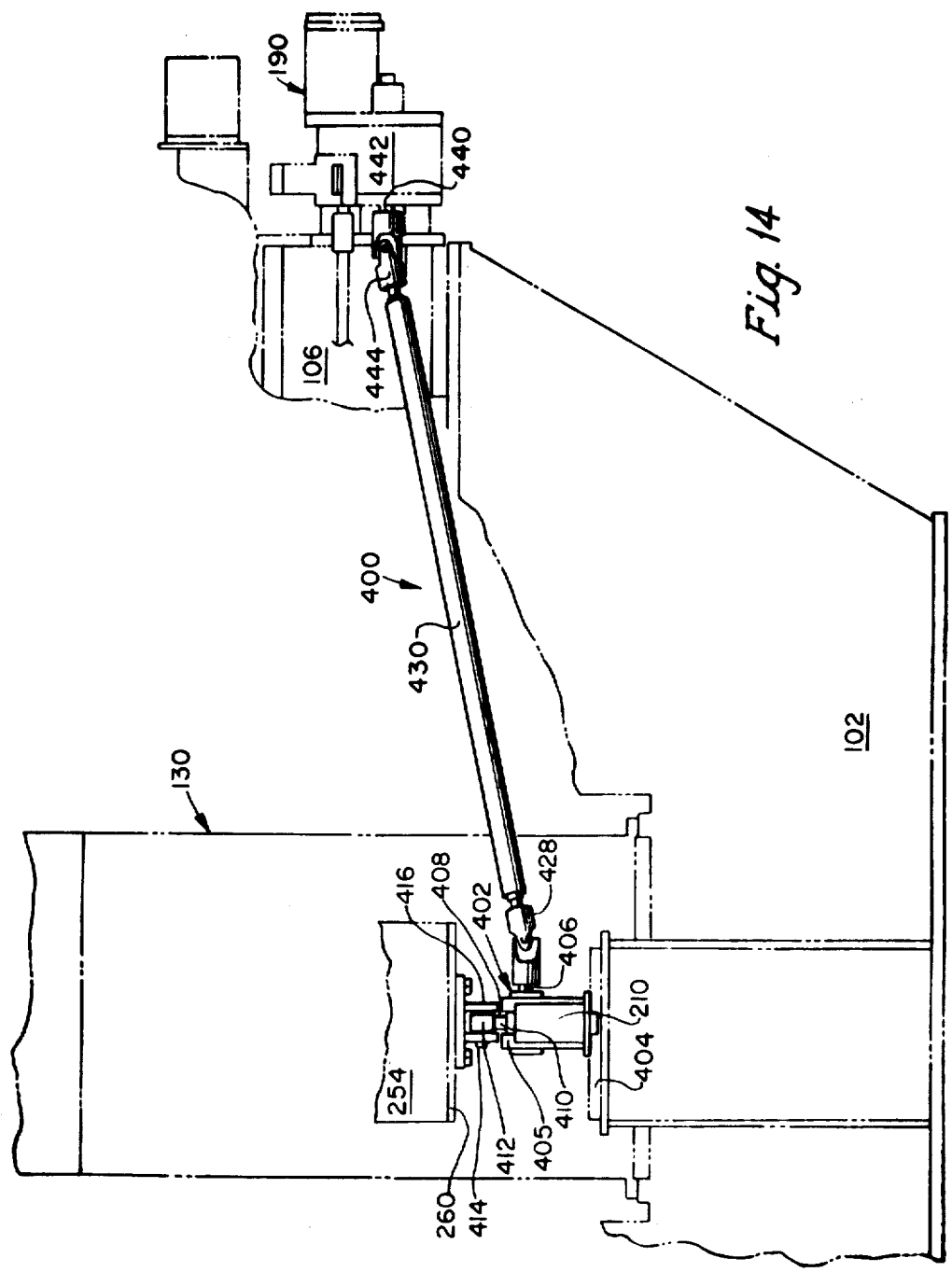

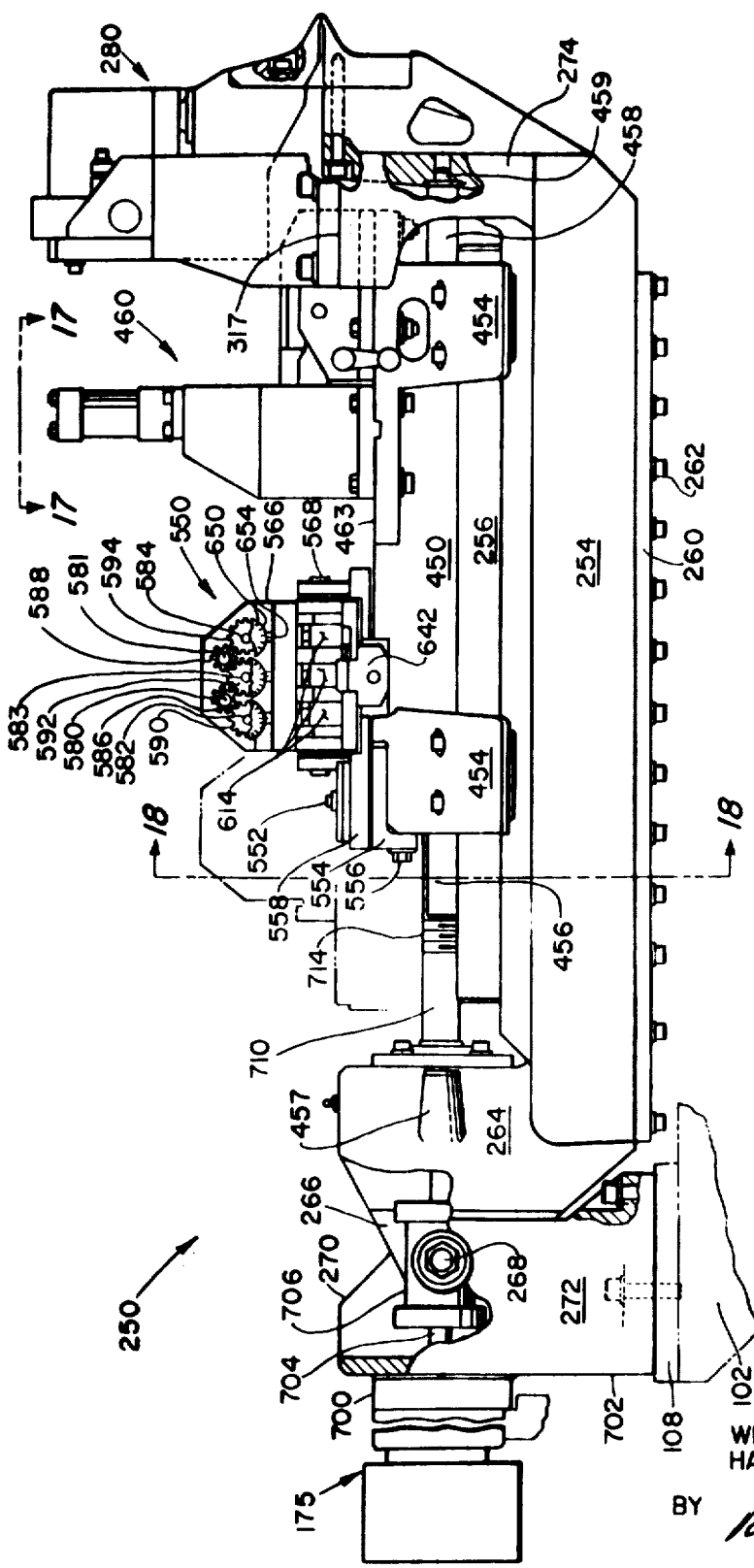

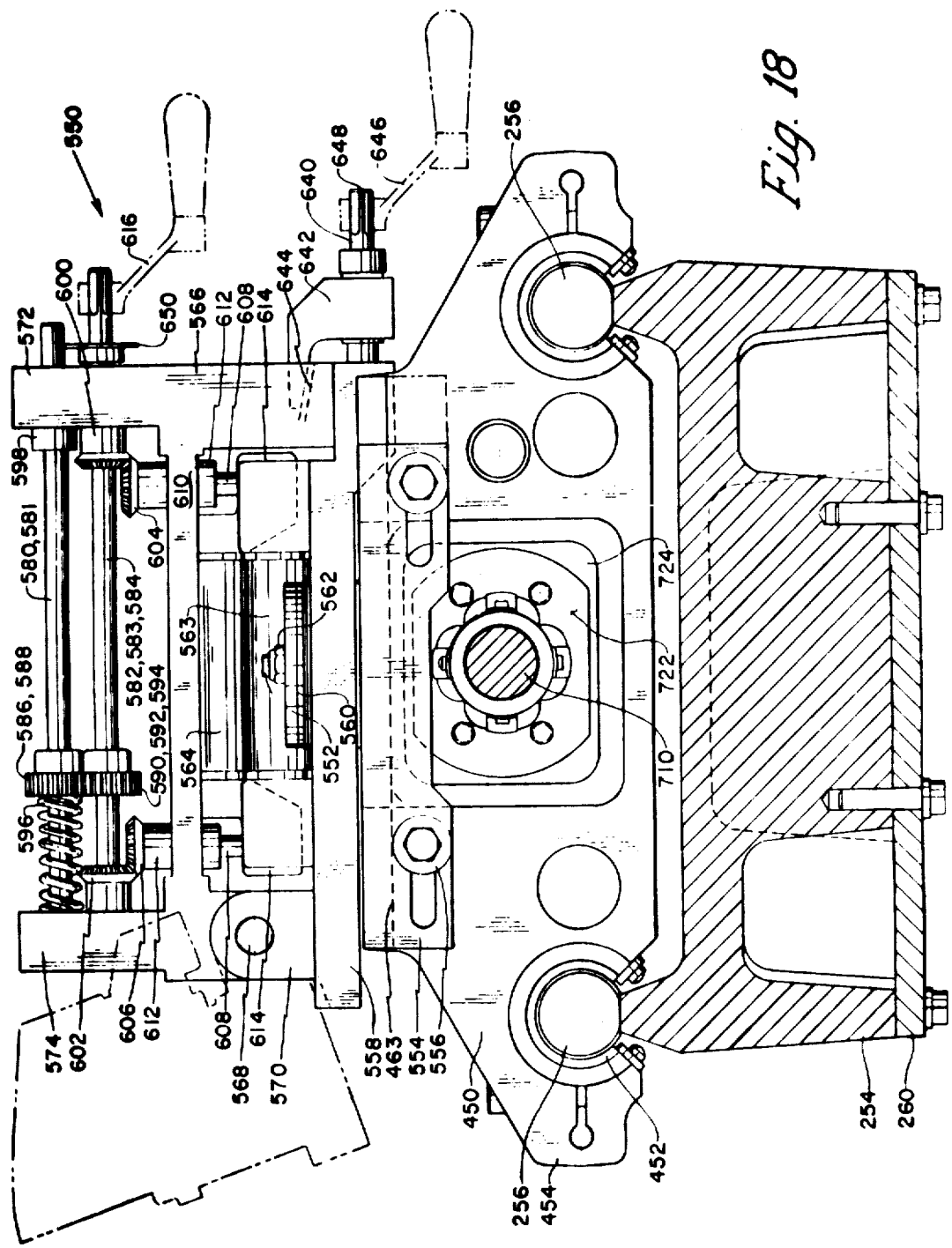

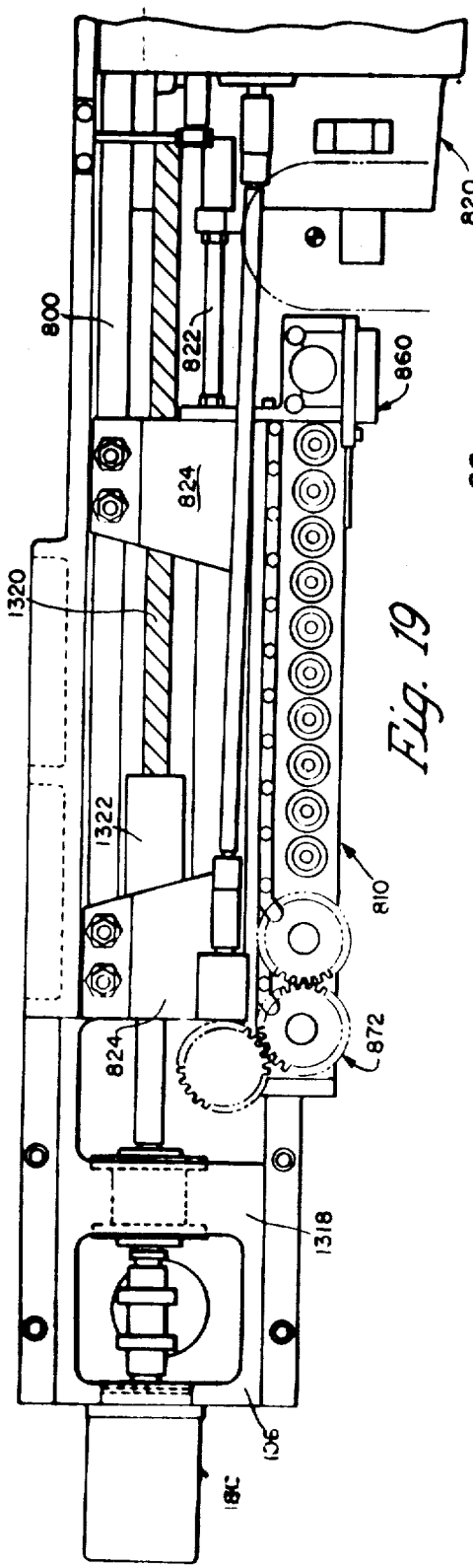
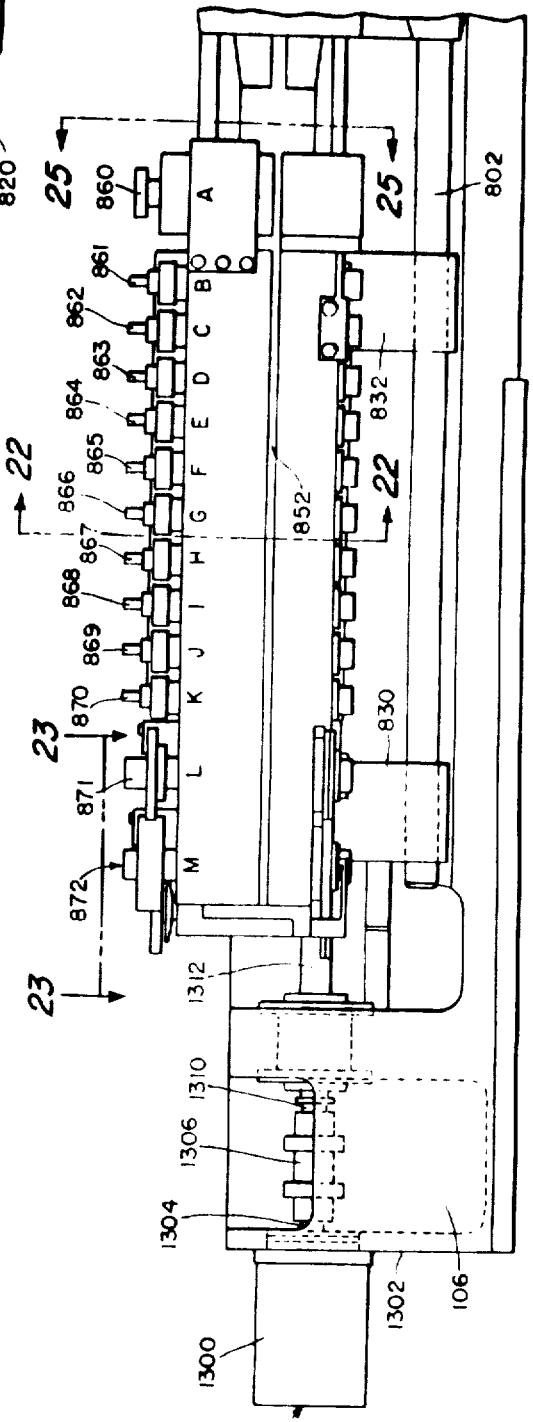

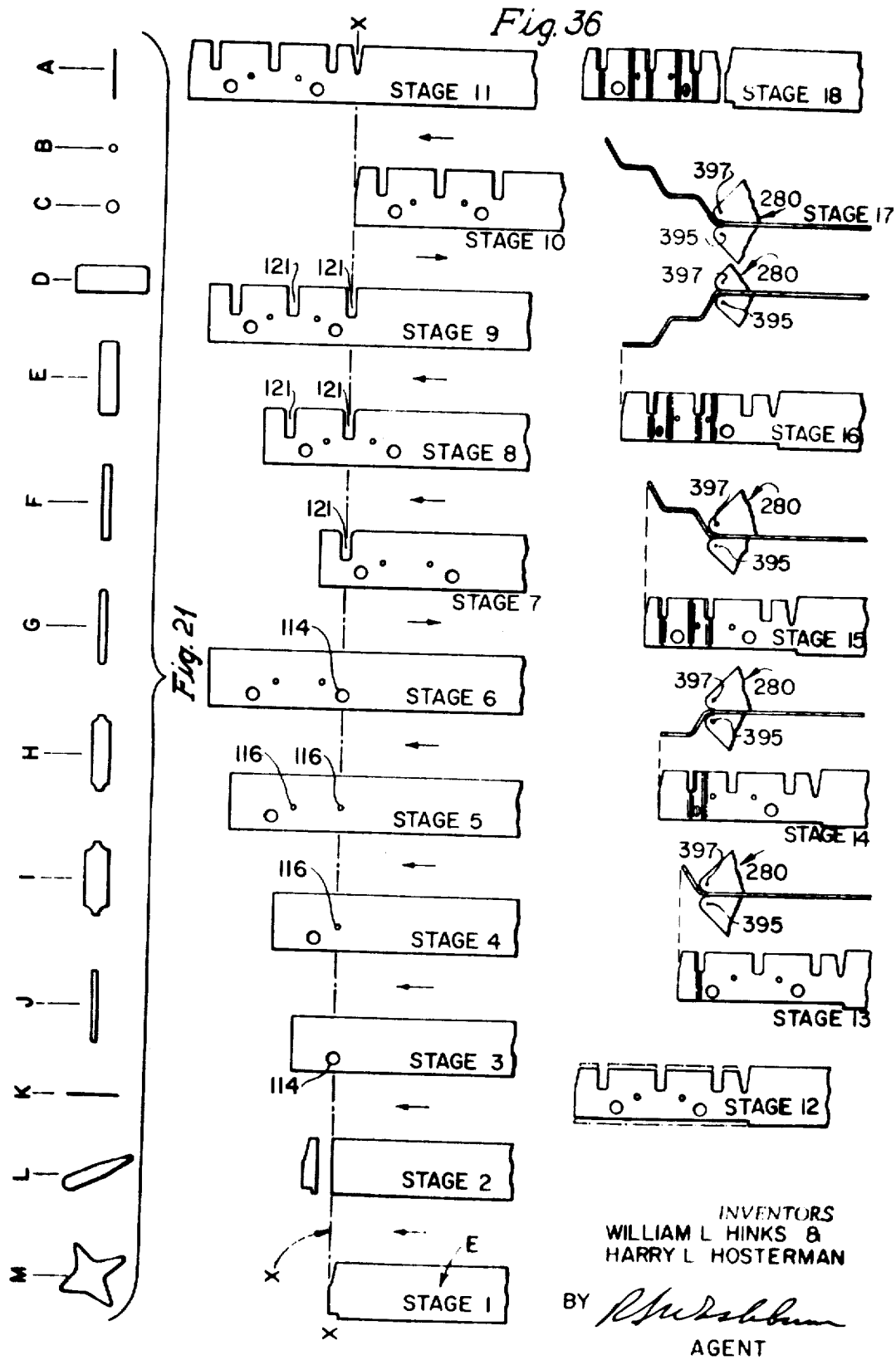

INVENTORS
WILLIAM L. HINKS &
HARRY L. HOSTERMAN

BY
AGENT

INVENTORS
WILLIAM L. HINKS
HARRY L. HOSTERMAN

BY
AGENT

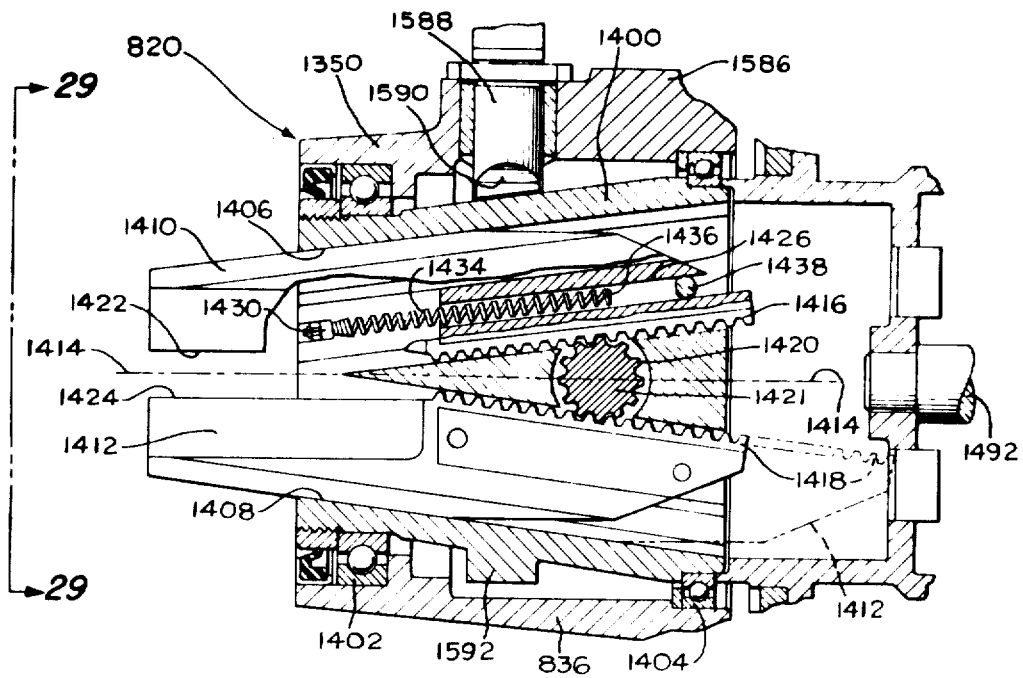
Fig. 28
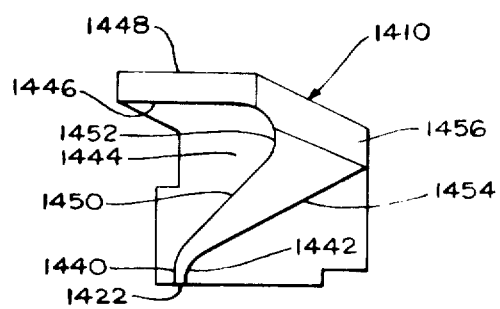
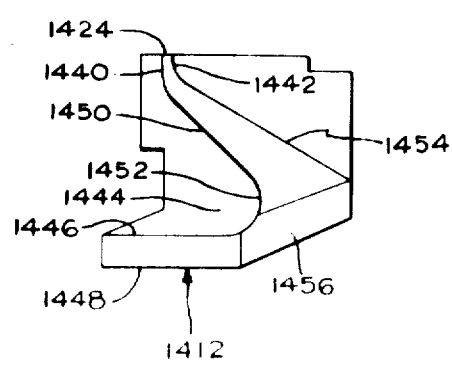
Fig. 29
INVENTORS
WILLIAM L. HINKS
HARRY L. HOSTERMAN
BY
AGENT

INVENTORS
WILLIAM L. HINKS &
HARRY L. HOSTERMAN

BY
AGENT

APPARATUS FOR MAKING BLADES

This application is a division of the applicants' prior copending application Ser. No. 744,120, filed July 11, 1968, now U.S. Pat. No. 3,581,535.

The present invention relates to making blades of the type which are inserted in tire molds to provide narrow grooves and similar impressions in the tread pattern of vehicle tires. More specifically, the invention relates to a method and an apparatus for manufacturing blades in a successive plurality of diverse shapes from an indefinite running length of strip stock.

Heretofore, blades for tire molds have been produced by stamping out the required shapes from sheet or strip material using generally conventional blanking, piercing, and forming dies, each of which is especially adapted to produce a single type and style of blade. A single tire mold for a particular tire employs a large number of blades and requires an average of 25 to 30 different blade configurations. It will be apparent that the procurement of specifically adapted blanking, piercing and bending die combinations required for each blade configuration is not only expensive but time consuming. Moreover, a large majority of tire designs processed in modern manufacture are experimental. Blades for more than a first mold may never be required so that relatively few blades of any particular configuration may be used. The cost per mold of blades made by conventional tools and methods is frequently excessive since any particular set of tools may be used to produce only a few blades.

Furthermore, the time required to prepare and put into use the conventional tooling to produce blades desired for an experimental tire mold may delay, and possibly prohibit, the testing of many desired experimental tire designs. The alternative of hand manufacture of the number of blades required for a single tire mold, although possible, is prohibitively expensive and still less satisfactory in terms of quality.

In addition to blades which are inserted or embedded in tire molds to mold forms conjugate to the blades themselves in a finished tire, blades suitable for use in electrical erosion machining of seats in which mold blades are subsequently embedded in tire molds, the process being known as "ELOX" machining, have been subject to the same disadvantages as have been cited. The present invention finds utility in both types of blades and in the present specification, both types as well as articles of similar character are referred to generically as blades.

It is therefore an object of the present invention to provide a technique or method capable of overcoming the difficulties and disadvantages of prior practice, and particularly to provide apparatus for carrying out the process so as to produce blades for tire molds at less cost and with less delay than heretofore required.

A further object of the instant invention is the provision of a system and apparatus capable of producing diverse shapes without the use of tools individually peculiar to the shapes of the blades required. An additional object is to provide a system and apparatus capable of blanking, piercing, or bending individual blades in immediately successive diverse configurations without requiring the procurement of tooling necessarily individually adapted to each of the desired configurations.

Still another object is the provision of apparatus for making blades of immediately successive different thicknesses, widths and materials without the necessity for any permanent modification or replacement of the tooling employed.

A further object of the present invention is the provision of apparatus for making blades, including immediately successive different blades, for tire molds, continuously and automatically from a running length of strip material, in predetermined number, character or sequence.

Other objects and advantages of the instant invention will become apparent or will be particularly pointed out in the description of specific aspects and particular embodiments of the invention which follows and from the annexed drawings forming a part of the description in which:

FIG. 13 is a plan view of a portion of the Y axis component of the apparatus of FIG. 1 taken as indicated by the line 13—13 in FIG. 11;

FIG. 14 is an elevation view of elevator means included in the apparatus of FIG. 1;

FIG. 15 is an elevation view of another portion of the Y axis component of the apparatus of FIG. 1;

FIG. 17 is a plan view of the portion of the apparatus indicated by the line 17—17 of FIG. 15;

FIG. 18 is an elevation view of the straightening device portion of the apparatus of FIG. 1, taken as indicated by the line 18—18 of FIG. 15;

FIG. 19 is a plan view and 20 is an elevation view of a portion of the X axis component of the apparatus of FIG. 1, showing the tool carrier;

FIG. 21 is a diagram showing the configuration of punch and die sets useful in the apparatus of FIG. 1;

FIG. 28 is a section view of the bending device taken as indicated by the line 28—28 of FIG. 27;

FIG. 29 is an elevation view of the bending fingers, taken as indicated by the line 29—29 of FIG. 28;

FIG. 36 is a sequence diagram of successive operations to produce a blade by the method and apparatus of the invention.

Figure 1:
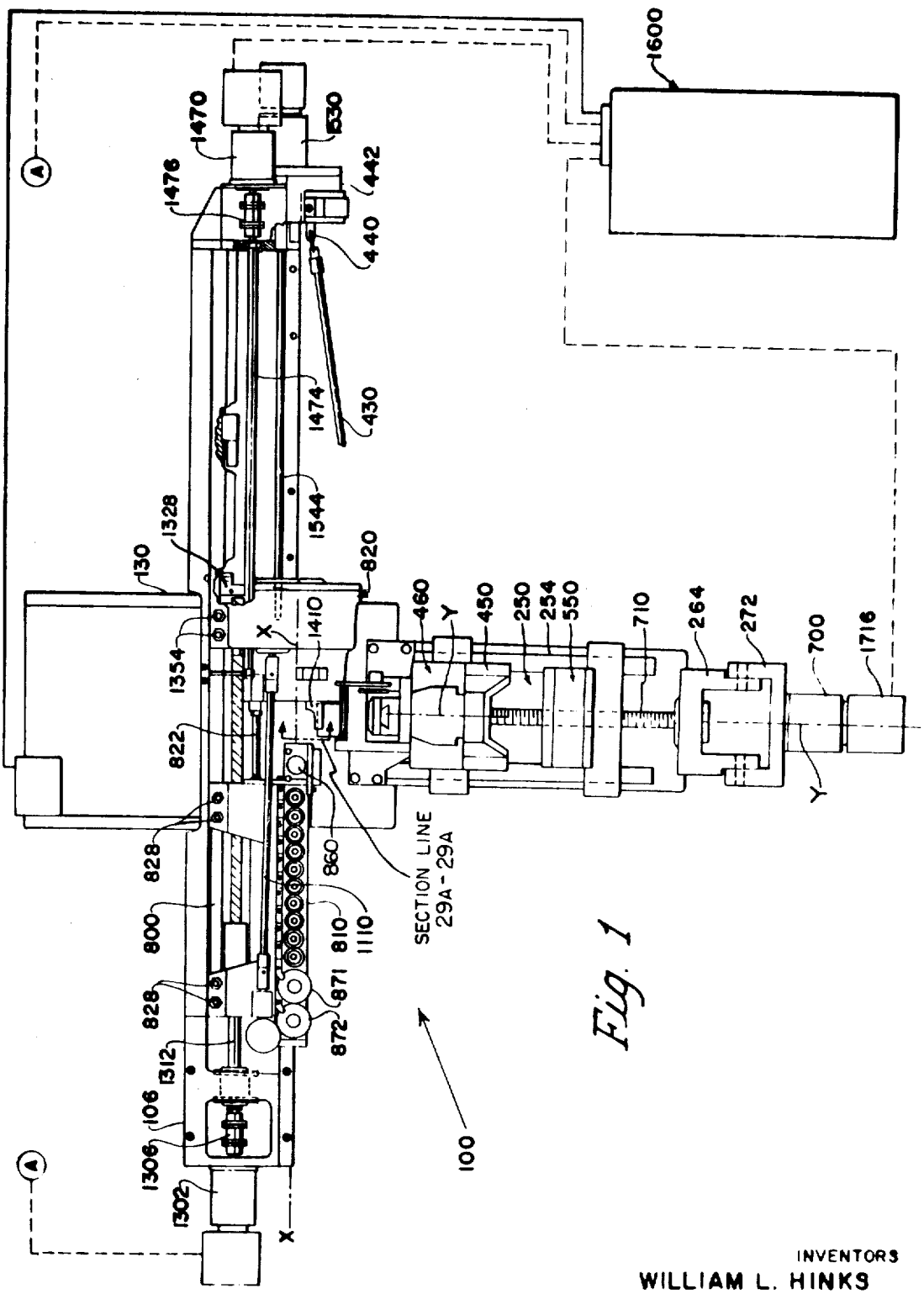
FIG. 1 is a plan view of apparatus embodying the invention.

According to the instant invention a method for making blades of divers configurations for use in molds for making tires comprises gripping a portion of a running length of strip material so as to support cantileverly a free end of the strip and so as to make the free end suitably accessible to perform thereon a sequence of material removing, altering and bending operations, moving the free end to successive predetermined positions along an axis parallel to the running length of the strip, moving a plurality of tools individually and successively into a predetermined sequence of shape altering engagements with said free end so that at each of the said positions a portion of the free end is punched, trimmed, sheared, or bent and each shape altering engagement provides an increment of the total alteration desired to convert the strip material to a particular blade configuration.

A first completed blade is cut off from the free end thereby providing a second or new free end on the strip material. The second free end is immediately moved along the same axis to position the second free end successively to a second series of predetermined locations, which can be identical to the first series or differ therefrom, and the said tools are individually and successively moved into a second predetermined sequence of shape altering engagements with the second free end so that the second sequence is either identical to or different from the first sequence. In the former case, a second blade identical in configuration to the first is completed and cut off. In the latter sequence a second blade of different configuration follows immediately after the first blade. Successive repetitions of the steps yield successive identical blades or successive blades of great diversity without requiring the intermediate procurement or installation of specialized dies configured to suit the several diverse blade configurations.

The Apparatus in General

According to the invention, apparatus particularly adapted for the practice of the method described is shown in the drawings. As in FIGS. 1, 2 and 3, the preferred apparatus takes the form of an automated machine tool 100 arranged to have three orthogonal axes indicated in the drawings, by X, Y and Z. Principal operative movements of the X, Y, and Z components of the machine tool 100 take place in directions parallel to these axes respectively and the description of the apparatus makes reference to these axes for convenience and clarity. An $a$ axis and a further special axis of operation and control will also be described.

Firstly, there will be described press means for actuating, individually, tools positioned in predetermined juxtaposed relation with a free end of a running length of strip material, which means is herein called the Z axis component and comprises in the present embodiment a punch press with certain appurtenances and modifications. Next will be described the means for positioning strip material and a free end thereof which in the present embodiment is termed the Y axis component and comprises strip material supply means, a strip moving carriage including straightening and guiding devices, gripping means for holding the strip, and elevation adjusting means. Thirdly, means for positioning tools individually into predetermined proximate relation to the free end of the strip material will be described, being referred to in the present embodiment and description as the X axis component and here comprising a tool positioning carrier movable along guide means and including a plurality of punch and die sets, a number of which may be rotatable, a cut-off die set, and a bending system and device. Finally, the system or means for storing and communicating to the several components of the machine tool a predetermined sequence or program of command signals will be described, which means in the present embodiment takes the form of a numerical control unit, operatively connected servo-control circuits, and drive means responsive individually to the servo-control circuits for providing movement respectively of the several components.

The machine tool 100 includes a base 102 suitably adapted to support and to maintain in operative relative position the several components of the machine tool 100 to be described. The base, in plan view as seen in FIG. 1, resembles a letter "T", the upper bar of which is parallel to the X axis of the machine tool and the upright of which is parallel to the Y axis thereof. Upper surfaces of the base corresponding to the upper arms of the "T" provide pads 104 which carry means for positioning a plurality of tools, including in particular a main frame member 106 of the X axis component. A portion of the upper surface of the base forming the stem of the "T" provides a pad 108 upon which is mounted means for positioning a free end of an indefinite running length of strip material, which is to say in the instant embodiment the Y axis component of the machine tool. Between the pads 104 on the upper arms of the "T" and at the top of the stem, the base 102 provides a further pad 110 on which is mounted press means for actuating a tool positioned by operation of the aforesaid means for positioning tools, in other words, in the present embodiment the Z axis component of the machine tool 100.

While the several components of the machine tool cooperate and act in conjunction in carrying out the method described, it will be convenient to describe the components separately and individually, discussing their mutual inter-action as the description proceeds.

Description of Blades

Figure 4:
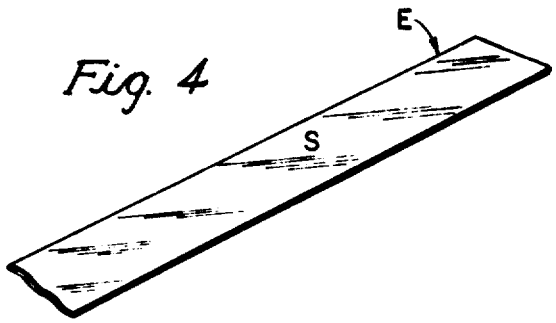
FIG. 4 is a perspective view of strip material useful in the practice of the invention.

Before proceeding with the description of the apparatus in detail, the description digresses briefly to a discussion of FIGS. 4 through 9. FIG. 4 shows a free end E of strip material or stock S from which blades of the character with which the present invention deals are made. The strip material S may be of any suitable metal, ferrous or non-ferrous such as brass, or substitute therefor. Conventionally, such blades are made of finished rolled stock of stainless steel of suitable grade and hardness.

Figure 5:
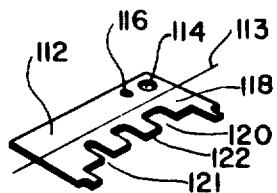

FIG. 5 depicts a blade having a portion 112 which, in normal use, will be embedded about to the line 113 in the body of the tread forming portion of a tire mold (not shown) and secured therein by one or more of the holes 114, 116 shown therein, in the conventional manner. Portion 118 in normal use will mold, in the tread of a tire, an impression conjugate to the form shown which includes the notches 120, 121 and projections 122. Notably the notches may take any desired form, may have parallel or non-parallel or angular sides, and may include square or rounded corners, as desired.

Figure 6:
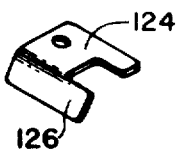

FIG. 6 shows another form of blade in which the blade is bent to form a plurality of adjoined panels 124, 126 disposed angularly with each other.

Figure 7:
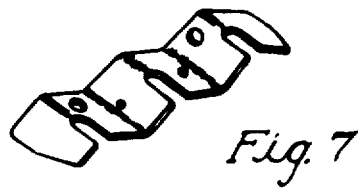
FIGS. 5 through 9 are perspective views of blades made by practice of the invention.
Figure 8:
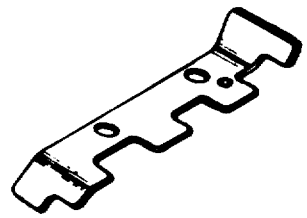
Figure 9:
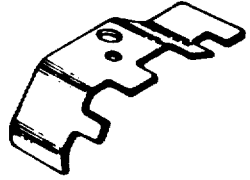

FIGS. 7, 8 and 9 show representative examples of the innumerable shapes and forms of blades capable of being produced with the method and apparatus according to the instant invention.

The Z Axis Component

According to the invention, actuating means are provided for actuating a selected one of a plurality of tools, the selected one tool being positioned proximate the free end E of the strip being processed by means subsequently to be described. Shown in the drawings, and particularly in FIGS. 2 and 3 thereof, an actuating means in the present embodiment is provided by the Z axis component of the machine tool 100 and includes a punch press 130 having a C type frame secured to the pad 110 of the base 102. Extending upwardly from its base 131 the press column 132 supports a head 134 in which is mounted a hydraulically reciprocable ram 136, the direction of movement of the ram 136 paralleling the Z axis of the machine tool, which axis is perpendicular with respect to the X and Y axes of the machine tool. In the present embodiment the press 130 is of the type commercially available as the Dennison Multi-Press, Model T080L, available from the Dennison Engineering Division, American Brake Shoe Company, Columbus, Ohio, modified as described herein.

The press platen 138 supports a pedestal 140 to which is attached an anvil 142 which cooperates, in a manner described later herein, with the press ram 136 in actuation of individual tools or die sets positioned between the anvil 142 and the ram 136. An opening 144 through the press platen 138 allows blades cut from the free end of strip material to fall into a chute (not shown) and thence to a receptacle. The invention also contemplates provision for limited movement of the anvil 142 parallel to the X axis to accommodate an increased range of positioning along the X axis of individual shaping tools. On the nose or lower end of the press ram 136 there is attached a transfer arm 146 and a punch holder striker block 148. The transfer arm 146, affixed to and moving with the ram 136, carries an actuating rod 147 connected to actuate the variable tap of a linear potentiometer (not shown) and conventional limit switches (not shown) activated at the limits of the stroke of the ram 136 upward and downward respectively. Variable voltage output from the potentiometer is amplified to modulate driving current in the solenoid valve 151 whereby the stroke of the ram 136 is limited to less than one inch.

Coordinated movement of the X axis and the Y axis components of the machine tool 100 serve to position a selected blade shaping tool and a free end of strip material S in predetermined juxtaposition with each other and with the Z axis, which is here the axis of the ram movement.

Hydraulic Power System

Figure 10:
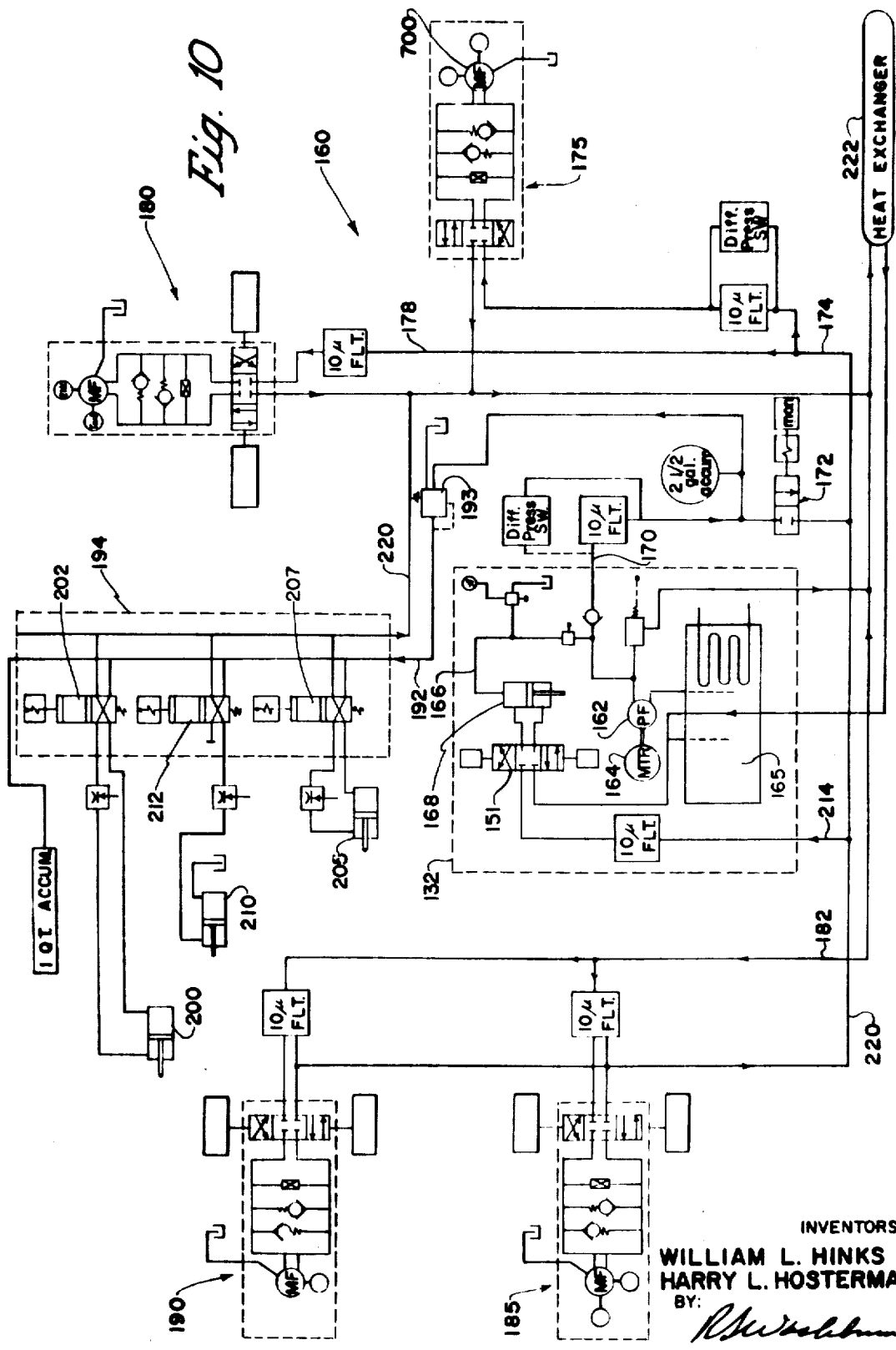
FIG. 10 is a schematic diagram of the hydraulic system of the apparatus of FIG. 1.

The apparatus includes a fluid pressure power system in the form of an oil hydraulic circuit 160, shown in FIG. 10. The circuit 160 includes the hydraulic pump 162 driven by an electric motor 164 connected to electric power supply means (not shown) and controlled by conventional motor control (not shown) which is housed with the control system to be described hereinbelow. The motor and pump, together with a supply tank 165, are housed within the press column 132. The pump 162 delivers oil at a predetermined pressure through a pre-fill line 166 to the hydraulic cylinder 168 which is used to operate the ram 136. The oil pressure supply line 170 including a conventional filter unit, is controlled by a solenoid operated shut-off valve 172 responsive to a command signal from the control system described later herein. The branch pressure supply line 174 supplies oil at system pressure to the traversing or positioning drive means 175 which operates as a part of the Y axis component of the machine tool 100 and which will be described in greater detail subsequently. The branch pressure supply line 178 supplies oil at system pressure to the traversing or positioning drive means 180 which operates with and forms a part of the X axis component of the machine tool, which also will be described in greater detail. The means 175 and 180 both are, herein, electro-hydraulic servodrive assemblies obtainable from the Datex Division, Conrac Corporation, 1600 So. Mountain Avenue, Duarte, California 91010.

The branch supply line 182 supplies oil at system pressure to the *a* axis component, a bending device rotation drive means 185, and to a bend finger and jaw position adjusting means 190. Both means 185 and 190 are herein likewise electro-hydraulic servo-drive systems obtainable from Datex Division, Conrac Corporation, previously identified, and which will be described in greater detail hereinafter. A further branch line 192 delivers oil at a suitably reduced pressure controlled by the pressure reducing valve 193 through a manifold mounting base 194 to a pair of clamp operating cylinders 200 and 205, respectively, each controlled by solenoid valves 202 and 207, respectively, and associated with clamp stock jaw means, which will be described in greater detail presently. Also mounted on the manifold base 194 is hydraulic operating cylinder 210 controlled by solenoid valve 212 which cylinder operates in conjunction with elevator adjusting means, also to be described subsequently. The branch line 214 delivers oil at the system pressure to an electro-hydraulic servo-valve 151 which controls the flow of oil to and from the cylinder 168. The valve 151 operates in response to command signals received from the control unit or means for communicating command signals so that the ram 136 is actuated in response to the command signals received from the control unit.

Return lines 220 return oil to the supply tank 165 through the heat exchanger 222.

The Y Axis Component

Figure 2:
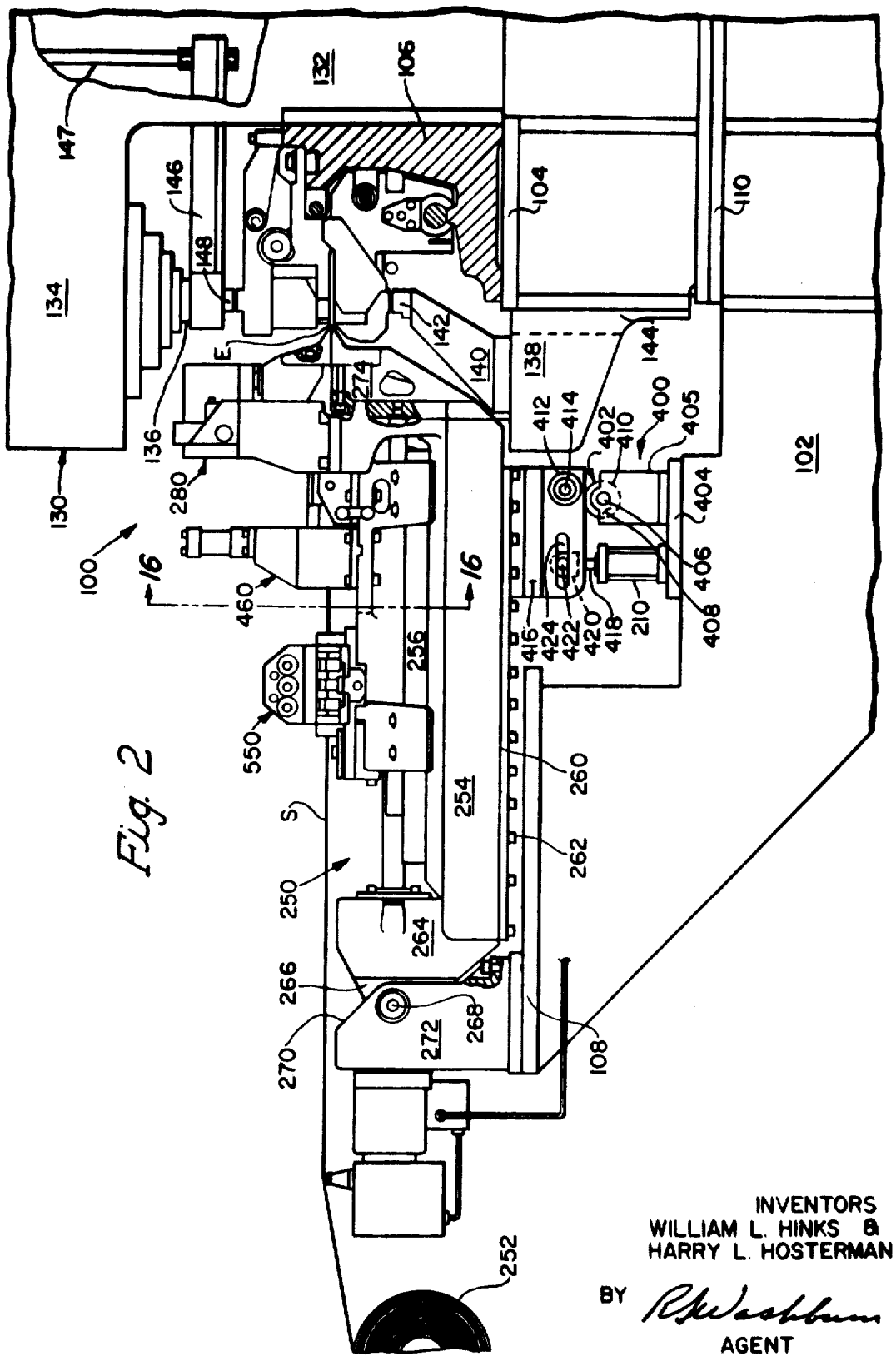
FIGS. 2 and 3 are elevation views of the apparatus of FIG. 1 with portions broken away.

Turning now particularly to FIG. 2, means for positioning the free end E of the strip S comprises a stock positioning assembly 250 adapted to receive a running length of strip material from a supply means such as the reel 252. The strip may, if desired, be lubricated as it is drawn from the reel, by conventional means. The assembly 250 includes the slide bed 254 having guide means in the form of a pair of spaced parallel guide rails 256 disposed longitudinally along an intermediate portion of its top surface and a stiffening cover plate 260 disposed to form its lower surface. The rails 256 and the cover plate 260 are secured to the bed 254 by cap screws 262 through the plate 260, the bed 254 and threaded into the rails 256. At the outward (or leftward, as shown) end of the slide bed 254, an upward extension 264 of the bed has a pair of flanges 266 carried on rock shaft means, the pivot pins 268, received in sidewall portions 270 of the bracket 272 which is mounted on the pad 108 of the machine tool base 102. At the inward (or rightward, as shown) end 274, the bed 254 is adapted to receive first strip engaging jaw means 280. The arrangement permits the bed 254 to be moved angularly about the pins 268 in a plane parallel to the plane defined by the orthogonal axes Y and Z enabling adjustment of the height or elevation of the jaw means with respect to the X axis for purposes more fully described later herein.

First Jaw Means

Figure 11:
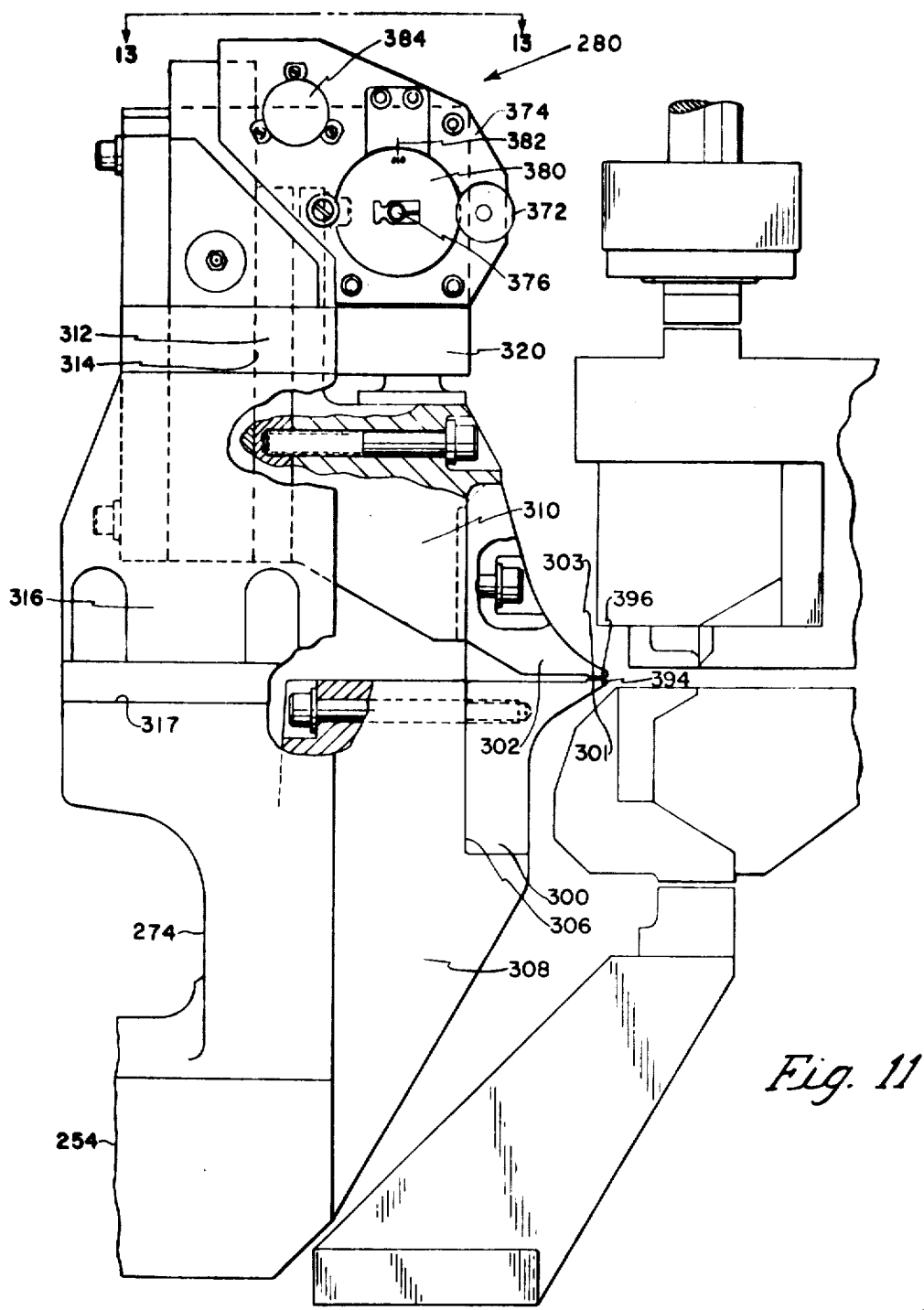
FIGS. 11 and 12 are elevation views of a portion of the Y axis component of the apparatus of FIG. 1.
Figure 12:
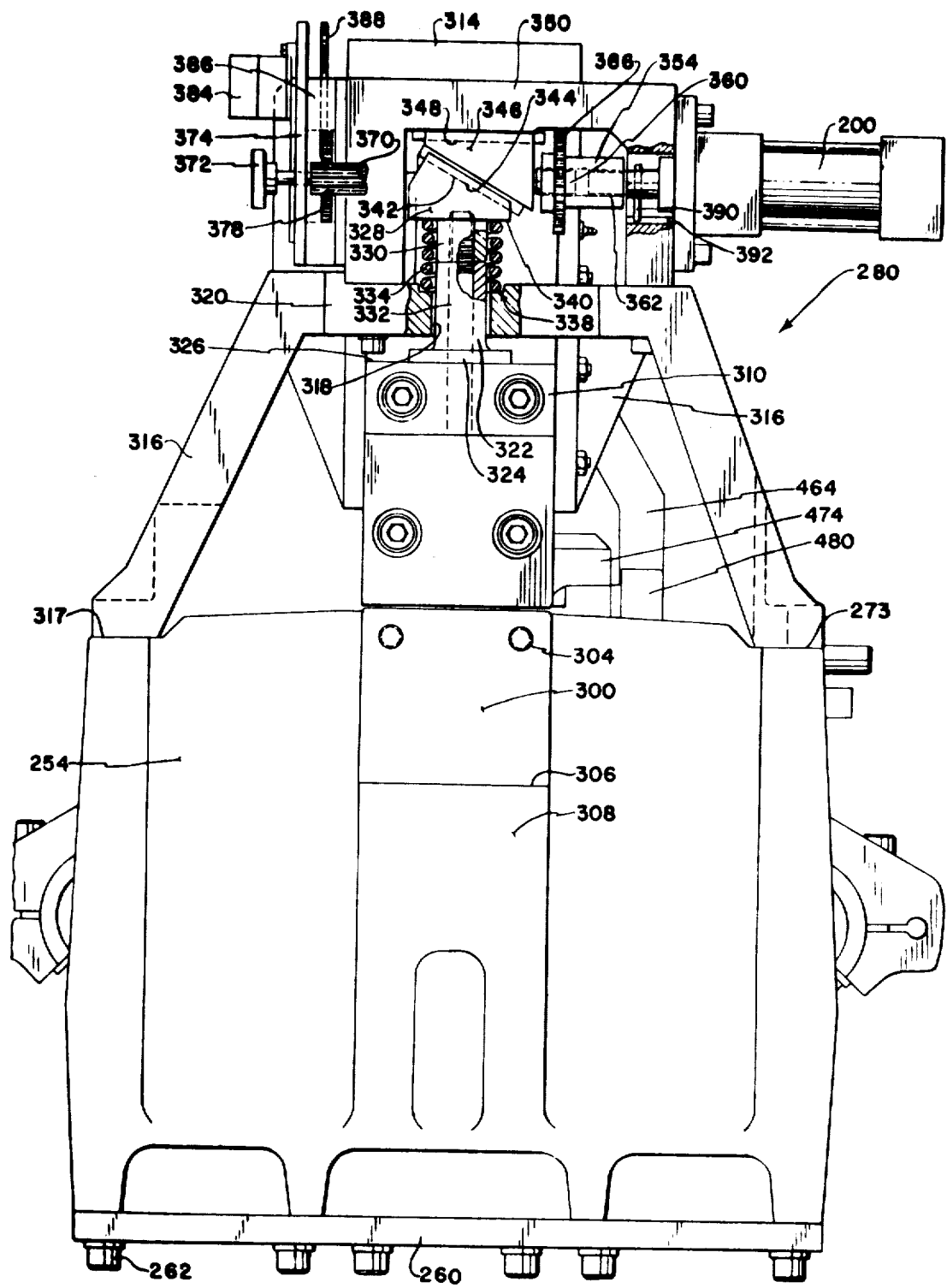

With reference additionally to FIGS. 11, 12 and 13, the first strip engaging jaw means in the form of a jaw assembly 280 comprises a lower jaw 300, with a stock strip engaging surface 301, fixed relative to the bed 254 and an upper jaw 302 having a strip engaging surface 303 movable toward and away from the lower jaw. The lower jaw 300 is secured by cap screws 304 in a jaw seat 306 provided in a buttress portion 308 of the bed 254. The upper jaw 302 is mounted, for limited vertical movement, in a movable head 310 a dove-tail 312 of which engages a dove-tail slide 314 carried by the housing 316 secured to the upper surface 317 at the end 274 of the bed 254. The jaws 300 and 302 are adapted to support a portion of the strip S with a free end E thereof extended cantileverly outward therefrom. Extending upwardly through an opening 318 in a cross-member 320 of the housing 316 is a bushing 322 having a flange 324 which is seated on an upwardly facing surface 326 of the head 310. Immediately above the bushing 322 a clamp wedge 328 having a cylindrical boss 330 generally coaxially aligned in face-to-face relationship with the bushing 322 is secured thereto by a bolt 332. A compression spring 334 extends between the face of a counter-bore 338 in the cross-member 320 and the opposed face 340 of the wedge 328 and is located generally concentrically with the bushing, the boss and the bolt. The spring 334 serves to urge the movable jaw head 310 and the jaw 302 upwardly away from the lower jaw 300. Upward movement of the movable jaw head 310 is adjustably limited by engagement of the upper angular face 342 of the wedge 328 with an opposed mating angular face 344 of a horizontal wedge 346 movable along the horizontal surface 348 provided on the upper yoke 350 of the housing 316. Adjustment of the limit of upward movement of the head 310 and movable jaw 302 is provided by an adjustment of the limits of horizontal movement of the upper wedge 346 with respect to the stroke of a piston within the fluid power cylinder 200 to which piston the wedge is connected, providing the advantage of preventing the insertion between the holding jaws 300, 302 of stock greater in thickness than the stock for which the machine is preset to accommodate. The mechanism by which this adjustment is achieved comprises a nut 354 having a turnbuckle effect provided by right and left hand threaded holes coaxial therein which holes receive respectively a threaded tang 360 affixed to the clamp wedge 346 and a threaded piston rod end 362 of the cylinder 200. Mounted concentrically on the nut 354 for co-rotation therewith is a gear 366 meshed rotatively with a pinion 370 of pinion shaft stock which also carries an adjustment knob 372 by which the thickness of the strip stock to be processed can be preset into the mechanism manually or otherwise. The pinion shaft 370 is journaled in a plate 374 secured on the yoke 350. An intermediate shaft 376 journaled in the plate 374 carries a gear 378 meshed co-rotatably with the pinion 370 and also carries a graduated dial 380. Attached to the plate adjacent the periphery of the dial 380 is an index marker 382 to which the graduations of the dial 380 are referred. A potentiometer 384 is mounted on the plate 374 with its rotatable shaft 386 extending through the plate to carry a gear 388 in rotational mesh with the gear 378. Adjustment of the knob 372 thus operates to set the limits of upward movement of the jaw 302 and to set the potentiometer 384 for purposes set forth later herein. Rotation of the adjustment knob 372, and the pinion shaft 370 causes a timed rotation of the gear 366 and the nut 354 to which it is attached so to move the clamp wedge 346 with respect to the piston rod end 362 as to relocate the end points of movement of the wedge 346 with respect to the travel of the piston in the cylinder 200. Rotation of the piston rod is prevented by a pin 390 fixed in the piston rod end 362 and engaging a key way 392 in the yoke 350. It will be apparent that actuation of the cylinder 200 to extend the piston rod 364 will, as seen in FIG. 12, move the clamp wedge 346 to the left and thereby move the wedge 328 downwardly together with the movable jaw 302 and head 312. Actuation of the cylinder 200 to retract the piston and rod 364 will cause the clamp wedge 346 to move to the right whereupon the compression spring 334 urges the first wedge member 328 upwardly to move the movable jaw 302 and head 312 likewise upwardly.

Figure 29A:
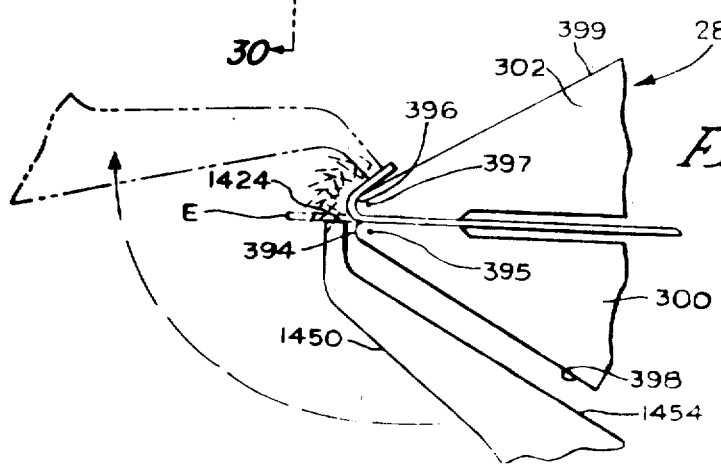
FIG. 29A is a partial elevation view of the bending device of the apparatus of FIG. 1, taken on the line 29A—29A in FIG. 1.

For purposes to be more fully described later (see also FIG. 29A), the lower jaw 300 includes a bending nose portion 394 of parti-cylindrical form disposed about a cylinder axis 395 and having a cylinder radius not greater than the minimum radius of downward bend intended to be made. Likewise the upper jaw 302 is provided with a bending nose portion 396 of parti-cylindrical form about the cylinder axis 397 at a radius not greater than that of the smallest radius of upward bend anticipated. Generally the nose portions 394, 396 have the same radii. The axes 395, 397 are parallel to the stock engaging surface 301, 303 respectively of the jaws 300, 302, and spaced therefrom such that the nose cylindrical surfaces are smoothly tangent to the respective surfaces 398, 399.

Elevator Cam Assembly

The elevator means are provided, in the present embodiment as shown by FIGS. 2 and 14, by the cam assembly and control means 400, to adjust the position of the first strip engaging jaw means 280 transversely with respect to the X axis of the machine tool, and particularly to elevate or lower the first jaw means 280, and the free end of the strip therein, up or down with respect to the bending device described subsequently herein. The elevator cam assembly 402 is mounted on the pad 404 of the machine tool base 102. The assembly 402 includes the cam support frame 405, a cam shaft 406 rotatably supported in bearings carried by the side members of the frame 405 and a cam 408 co-rotatable with the shaft 406. The cam surface 410 of the cam 408 engages a cylindrical cam follower or roller 412 mounted on a shaft 414 carried in the upright portions of the roller bracket 416 which is secured to the cover plate 260 of the bed 254. Also mounted on the pad 404 adjacent to the frame 405 is a hydraulic cylinder 210 having a piston rod 418 terminating in a clevis 420 which receives a pin 422 therethrough. The outward ends of the pin 422 are received in slots 424 in the upright portions of the bracket 416. The cam shaft 406 is coupled by flexible coupling 428 to the floating shaft 430 connected with the output shaft 440 of the reduction gear set 442 by the flexible coupling 444. The cam surface 410, is provided with a constant radius, or cylindrical portion, which operatively engages the roller 412, since in the present embodiment, the bending nose axis 395 does not require repositioning to accommodate changes in stock thickness, for downward bends in the stock. Upward bends in the stock, on the other hand, are made in cooperation with the upper jaw 302, the elevation of which is changed in accordance with the thickness of the stock to be bent. The cam surface 410 has a second portion with progressively decreasing radius or cam ramp, which engages the roller 412 to position the bending nose axis 397 into collinear alignment with the rotation axis of the bending device as will be further described later herein. It will be appreciated that rotation of the shaft 430 will move the cam surface 410 to raise or lower the bed 254 and the jaws 280 so that the nose portion axes 395 and 397 are suitably positioned with respect to the X axis. As will appear later herein, the rotation of the cam 408 is in timed relation with and responsive to the command signals communicated to a finger and jaw adjustment drive means 190.

The clamp cylinder operates to hold the roller 412 and the cam surface 410 in firm contact with one another during forming operations upon the strip, and to reduce the pressure of such contact during rotational movement of the cam. The cylinder control valve 212 is actuated in response to signals emanating from the control system presently to be described.

Stock Positioning Carriage Assembly

Figure 16:
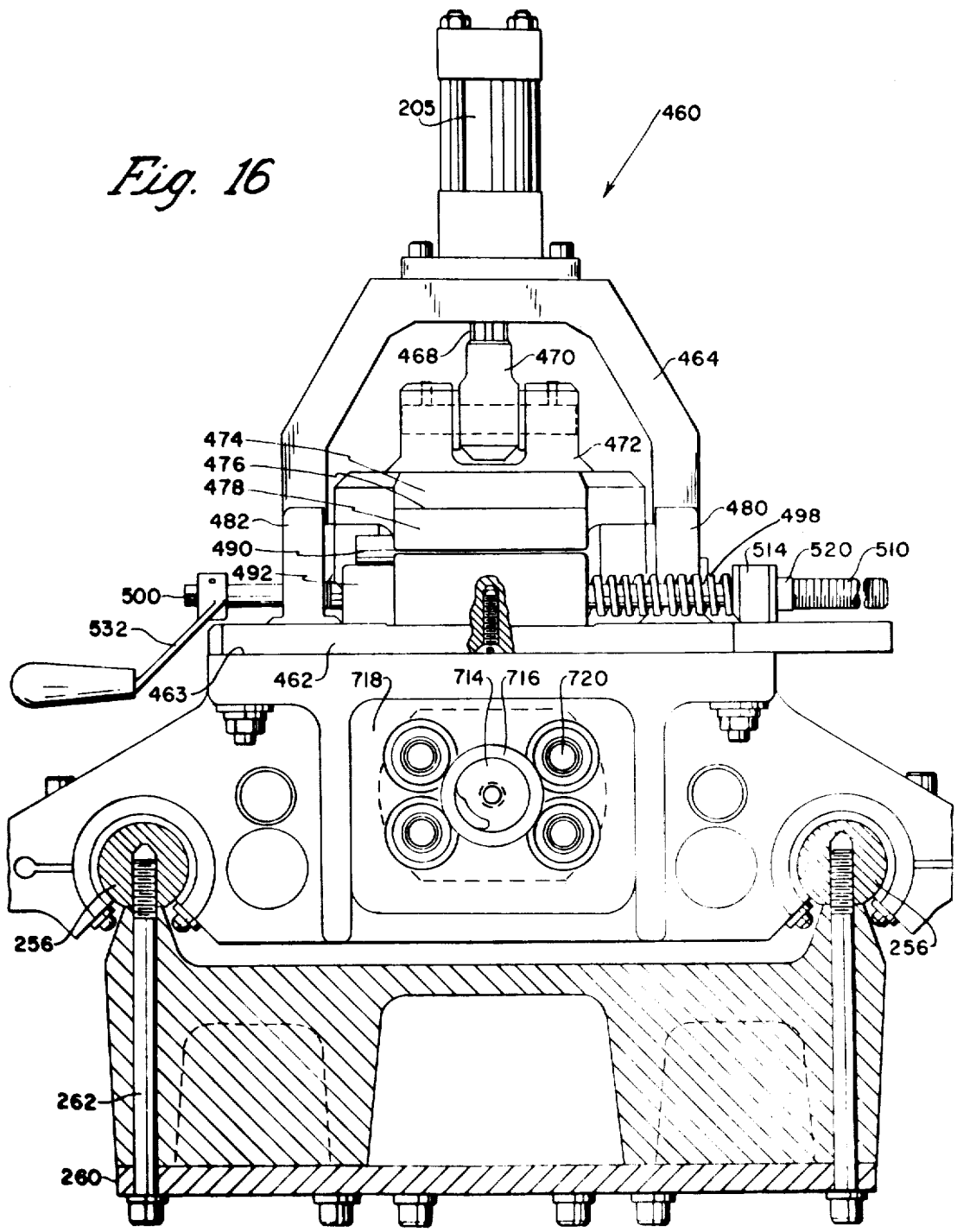
FIG. 16 is an elevation view of the carriage portion of the Y axis component of the apparatus of FIG. 1, taken as indicated by the line 16—16 of FIG. 2.

As may be seen in FIGS. 2, 15 and 16, the stock positioning assembly 250 further includes carriage means 450 mounted slidably on the guide rails 256 of the bed 254 by linear bearings 452 secured in foot brackets 454. The carriage 450 is movable between a first limit position, shown in phantom outline, at the outward, or leftward end 264 of the bed where its leftward movement is arrested by a spring snubber 456 abutting the stop 457 and a second limit position, as shown in full outline, at the inward or rightward end 274 of the bed where its rightward movement is arrested by engagement of the spring bumper 458 and stop 459. Between the two described limit positions the carriage 450 may be moved in substantially infinitesimal steps to any location along the Y axis. In the embodiment being described, the movement of the carriage is nominally about 5 inches.

Second Jaw Means

Referring additionally to FIGS. 16 and 17, second stock engaging jaw means is provided by a translating or moving jaw assembly 460 comprising a sub-base 462, secured to the carriage surface 463 and a yoke frame 464 extending upwardly over the sub-base to support the fluid power cylinder operator 205, the piston rod end 468 of which is attached by a clevis 470 to the yoked end 472 of an upper pivotally mounted jaw member 474 which carries at its other end a jaw 476 opposed to a lower jaw 478 affixed to the sub-base 462. The jaws 476 and 478 are adapted to grip a portion of the strip S and to support cantileverly a free end E so that by movement of the carriage 450 the end is suitably positioned in successive fixed locations with respect to the X and Z axes in response to signals as will be further described. A pair of flanges 480, 482 standing upwardly from the sub-base 462 each has a pin 484 which pins are received in a pair of coaxially mounted bushings 486 seated in the upper jaw member 474 and support the member for the pivotal movement thereof about the pins 484 by action of the cylinder 205. To register the width of the strip S accurately in position, a pair of fixed guide roller 490, rotatable about substantially vertical axes, are mounted upon bosses 492, extending upward from the sub-base 462. A pair of adjustably mounted guide rollers 494, rotatable about vertical axes, are carried by blocks 495, on studs passing through slots 496 in a yoke 497 and urged transversely with respect to the Y axis under the influence of the compression springs 498. Extending transversely of the Y axis and below the path of the strip is a shaft 500 mounted for rotation in the flanges 480, 482 respectively and secured therein against axial movement by the thrust collars 504 bearing upon the surfaces of the flange 480. A portion 510 of the shaft is provided with screw threads which are threadably engaged in a tapped hole 512 located in the central portion of the bar 514 at the opposite ends of which the bolts 520 extend through the holes 524, through the springs 498 and are threadably secured into the blocks 495. Rotation of the shaft 500 by the crank 532 enables movement of the bar 514 and the adjustable guide rollers 494 toward and away from the fixed guide rollers 490, so as to provide a desired degree of lateral restraint against the edges of the strip material passing through the jaw assembly 460. Actuation of the cylinder operator 205 pivotally moves the upper jaw member 474 so as to move the jaw surface 476 toward the lower jaw 478 to grip a portion of the strip for movement with the carriage 450, or away from the lower jaw 478 to release the strip and permit independent relative movement between strip and carriage 450.

Strip Straightening or Leveling

As may be seen in FIGS. 15 and 18, the Y component includes, on the upper surface 463 of the carriage 450 and for movement therewith, a strip straightening, leveling device 550. Self-alignment, castering, or pivoting means are provided for the straightening device 550 and comprise a stud 552 affixed upright in the transversely adjustable bracket 554 which is secured to the carriage 450 by the cap screws 556. The lower frame member 558 is suitably bored to receive the stud 552 and pivot therearound and is restrained against vertical movement by the clamp washer 560 and nut 562. Traversing movement of the device 550 relatively with respect to the strip S is enabled to straighten the material without imposing undesirable lateral forces on the strip being straightened. Four parallel rollers 563 engageable with the underside of the strip S are rotatably mounted in the frame member 558 and three parallel rollers 564, also engageable with the strip S on the upper side thereof, are rotatably mounted in the upper frame member 566. The member 566 is hinged to the lower frame 552 about the hinge pin 568 received in the ears 570 of the lower member 552. The upper rollers 564 are individually or collectively adjustable vertically with respect to the lower rollers 563 by the operation of a plurality of parallel rotatable cross shafts 580 to 584 inclusive, carried by the upright walls 572, 574 of the upper frame member 566.

The cross shafts 580 and 581 respectively have co-rotatably mounted thereon the gears 586 and 588. The gear 586 on the shaft 580 is rotatably meshed with a gear 590 on the shaft 582 and with the gear 592 on the shaft 583; the gear 588 on the shaft 581 is co-rotatably meshed with the gear 592 on the shaft 583 and with the gear 594 on shaft 584. Shafts 580 and 581 are also longitudinally slidably mounted in the walls 572 and 574, being urged forward (to the right in FIG. 18) by the springs 596, the stop collars 598 mounted on the shafts and bearing against the inner-face of the wall 572. The cross shafts 582, 583, and 584 each carry two bevel pinions, 600 and 602, which are engaged respectively with bevel pinions 604 and 606, each of which is secured to a screw 608 rotatably journaled in the web 610 of the upper frame member 570. Each of the six screws 608 carries a thrust collar 612, bearing against the under-surface of the web 610. Each screw 608 is threadedly received in a roll chuck 614 each of which respectively receives a journal of one of the upper rolls 564. Thus, rotation of the crank 616 mounted on the shaft 583 is operable to raise or to lower the upper rollers 564 together. By moving one or the other, or both, of the shafts 580 or 581, toward the left, the gear 586 or the gear 588, or both, may be disengaged from the gear 592 on the shaft 583 so that independent adjustment of the rollers 564 can be made.

The lower frame member 552 is provided with a screw 640 which carries a wedge clamp 642 movable inwardly into clamping engagement with a sloped surface 644 provided in the upper frame member 566 or outwardly clear of clamping engagement by actuation of the crank 646 carried by the splined end 648 of the screw 640. The shafts 582, 583, 584 are provided with graduated dials 650, secured co-rotatably thereon. Index markers 654 are mounted on the outer surface of the wall 572 adjacent the periphery of each of the dials 650, enabling the graduations of the respective dials to be aligned to the markers.

As will later be described in greater detail, movement of the carriage 450 away from the first jaw means 280 is operable to straighten, level and tension a portion of the strip engaged by the rolls of the device 550 as it is moved relative to the strip held by the first jaw means 280. Straightening of the strip takes place close to the free end but effectively isolated from the shaping operation thereon without use of an intermediate loop or festoon and without need for an independent drive to the straightening device or to the rollers. The pivotal mounting of the device effectively reduces tendencies of straightening rolls to misguide or redirect the strip alignment.

Stock Positioning Drive

Referring now to FIGS. 2, 15 and 16, traversing or positioning drive means for moving the carriage 450 comprises the electro-hydraulic servo-drive assembly 175 which includes a hydraulic motor 700 affixed to the end wall 702 of the bracket 272. An output shaft 704 of the motor 700 is connected by a zero backlash coupling 706 to one end of a precision ball lead screw 710 which is supported for rotation without axial displacement in bearings mounted in the bed end portion 264. The threaded portion 714 of the lead screw 710 extends longitudinally of the bed 254 parallel to the guide rails 256 and is threadedly engaged in a precision ball screw nut 716 secured to the web 718 by the bolts 720 screwed into the plate 722 borne by the web 724 of the carriage 450. Rotation of the lead screw moves the carriage 450 toward or away from the X axis along a path parallel to the Y axis of the machine tool 100.

The X Axis Component

Figure 3:
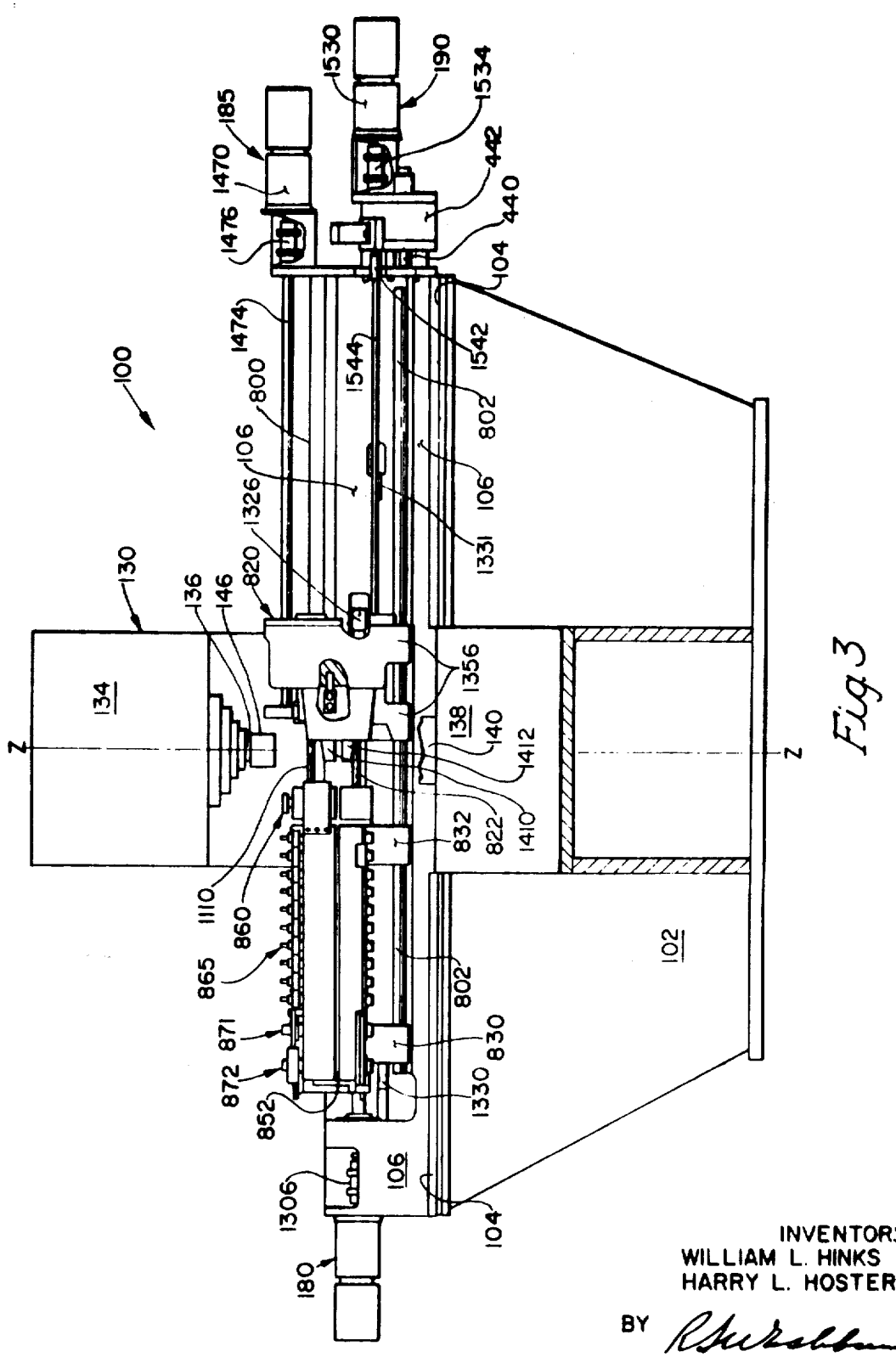

Referring now particularly to FIGS. 3, 19 and 20, means for positioning tools, in the present embodiment the X axis component of the machine tool 100, comprises guide means in the form of a frame member 106 secured upon the pads 104 of the base 102 and bridging over the platen 138 of the press 130. The frame member 106 provides track means here including the channel 800 and the guide bar 802, both extending substantially from one end to the other of the frame member 106 parallel to the X axis. Mounted upon the frame member 106 for movement along the track means parallel to the X axis are the carrier 810 and the bending device 820. The tie member 822 is fixed to the carrier 810 and to the bending device 820 and maintains a fixed spaced relation therebetween. The carrier 810 has a pair of brackets 824, on each of which are affixed guide rollers 828 in engagement with the guide channel 800 and includes a pair of pedestals 830,832 each having a slide bearing 834 engaging the guide bar 802. The bending device is described in greater detail later herein.

In the embodiment described the bending device 820 is adapted to move transversely with respect to the free end of the strip and parallel to the X axis, i.e., the path of movement of the carrier 810. It is within the contemplation of the invention that a bending device be mounted for movement in any suitable path between a position for engagement with the free end of the strip and a second position removed from such engagement. For reasons which will presently become apparent, several advantages are obtained from the herein described arrangement.

The Tool Carrier

The tool carrier 810 supports a plurality of shape altering tools. The carrier 810 has an open passage 852 extending into and along the carrier 810 parallel to the X axis and to the Y axis to admit the free end of the strip as the carrier 810 is moved transversely of the strip and the Y axis. The shape altering tools comprise a plurality of punch and die sets 860–872 inclusive.

Digressing briefly from the description of the X component, it should be noted that punch and die sets of any particular configuration suitably adapted to remove increments of the total outline configuration of a desired blade may be employed. FIG. 21 shows configurations of punch and die sets which are used advantageously in the practice of the invention. The letters A through M in FIGS. 20 and 21 represent the stations at which the particular punch sets are employed and correspond to the stations as lettered in FIG. 20. Station A identifies the cut-off station discussed later herein. Stations B and C are employed to provide holes such as the holes 114, 116 shown in FIGS. 6–9. Stations D, E, F, G, H, J, K, L are employed to perform material removal in increments resulting in the notches, serrations and projections such as are depicted in the blades shown in FIGS. 6 through 9.

Manufacture of blades of the type shown and described is not necessarily limited to removal of material from the strip. The punch and die sets may include, when desired, sets adapted to perform deforming, cupping, dimpling, coining and like alterations of shape of the strip material.

Punch and Die Sets

Figures 22, 23:
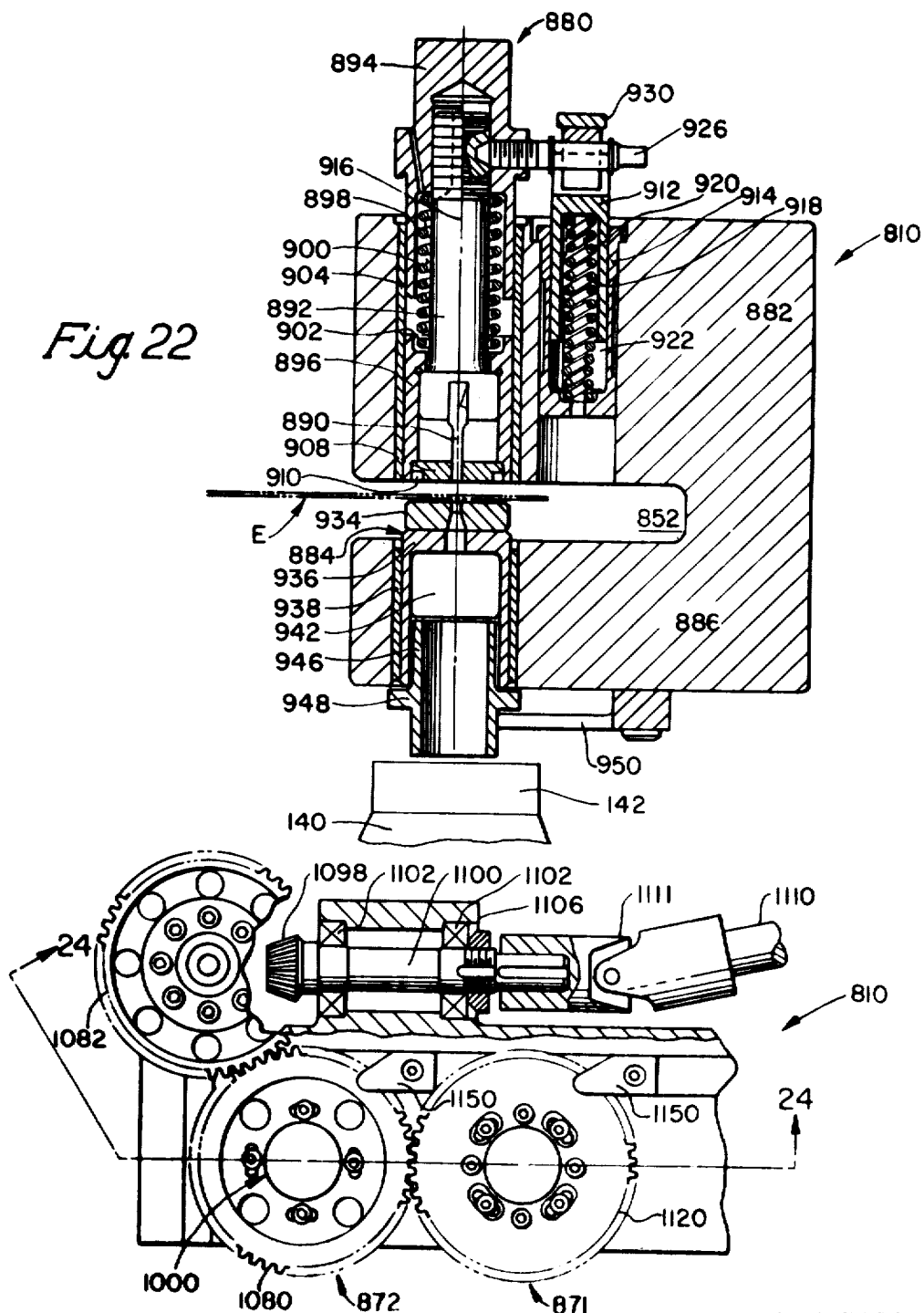
FIG. 22 is a sectional view of a representative one of the punch and die sets included in the apparatus of FIG. 1, taken as indicated by the line 22—22 of FIG. 20.
FIG. 23 is a plan view of rotatable punch and die set portion of the apparatus of FIG. 1, taken as indicated by the line 23—23 of FIG. 20.

Turning now to FIG. 22, a punch and die set representative of the several sets, 861–870 inclusive, employed in the practice of the invention, includes a punch assembly 880 mounted in the upper body portion 882 of the carrier 810 above the passage 852 and a die assembly 884 mounted in the body portion 886 below the passage 852. The punch assembly 880 includes a punch 890 secured in the shank 892 received within the punch holder 894 and within the stripper holder 896. The stripper actuating spring 898 is disposed around the shank 892 and within counterbores 900, 902 respectively in the punch holder 894 and the stripper holder 896, both holders being slidably received in the sleeve 904 snugly fitted in and extending through portion 882 of the carrier 810 normal to the plane defined by the X and Y axes. The stripper plate 908 is secured in the stripper holder 896 by a retaining ring 910. The lifter plunger 912 is slidably received in a flanged bushing 914 secured in the portion 882 with its axis parallel to and spaced from the punch axis 916 and has a counter-bore 918 receiving the lifter spring 920 extending into the counter-bore 922 and to the ends of the respective counter-bores. A stud 926 fixed in the punch holder 894 is engageable with the lifter plunger 912 and with the stop 930 fixed to the top of the carrier 810 by a cap screw or the like (not shown).

The die assembly 884 of the set shown in FIG. 22 includes the die button 934 attached to the die holder 936 which is slidably received in the bushing 938 secured in and extending through the lower portion 886 in coaxial alignment with the punch assembly 880. The die holder 936 is threaded internally of the counter-bore 942 and therein receives the threaded male end of the anvil spacer 946, the flange 948 of which is engaged by the cantilever die spring 950 which serves to lift the die assembly 884 slightly to an idle position to clear the anvil 142 during movement thereover of the carrier 810, and to permit the die assembly 884 to move downward against the anvil 142 into a working position.

Rotatable Punch and Die Sets

Figure 24:
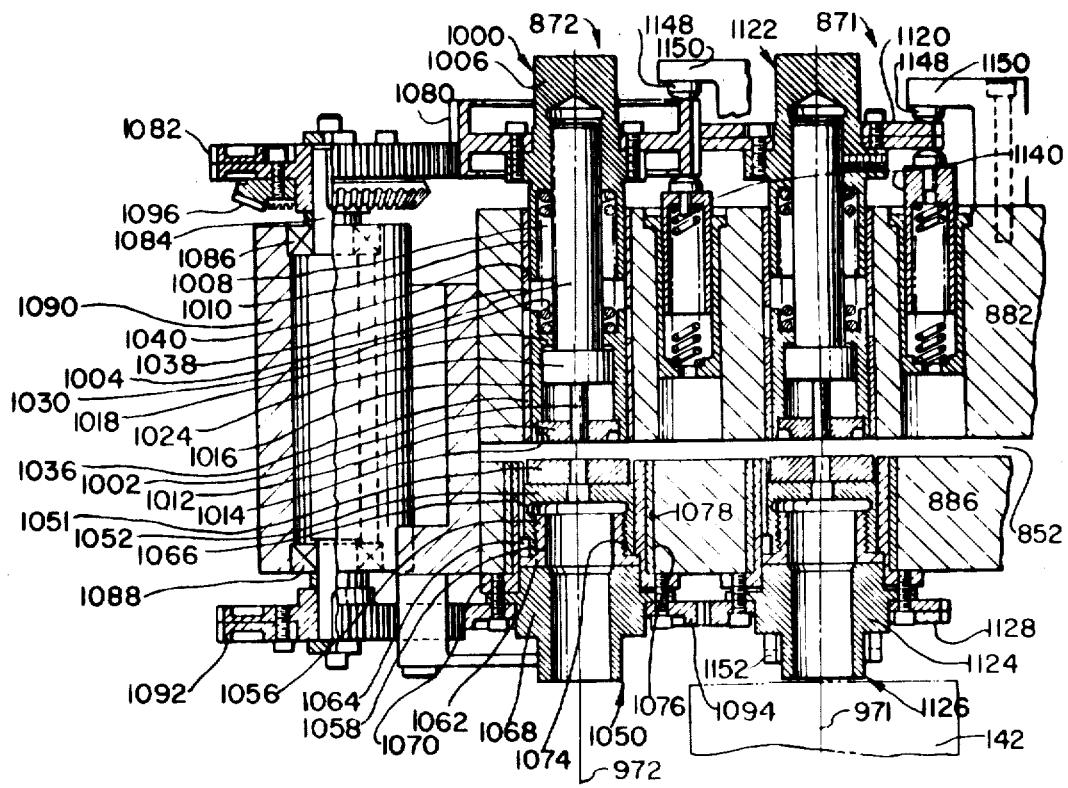
FIG. 24 is a sectional view, portions thereof broken away, of the rotatable punch and die sets taken as generally indicated by the line 24—24 of FIG. 23.

Included in the plurality of tools supported by the carrier 810 are punch and die sets 871, 872 which are rotatable about axes 971, 972 respectively normal to the plane defined by the X and Y axes, which is to say the plane defined by the direction of movement of the tool positioning means and of the stock positioning means. The rotatable die sets 871, 872 are shown in greater detail in FIGS. 23 and 24. There may be any number of rotatable die sets; in the present embodiment two have been found to be convenient. The set 872 comprises a punch assembly 1000 including a punch 1002 secured to a punch shank 1004 which is screwed into the punch holder 1006 and there secured by a lock screw (not shown). The punch holder 1006 includes a counter-bore 1008 and a cylindrical skirt 1010, both of which are coaxial with the shank 1004. A stripper 1012 is secured by the snap ring 1014 in the stripper guide 1016 which has an internal flange 1018, one face of which abuts a face of an enlarged portion 1024 of the shank 1004. Disposed about the shank 1004 from the bottom of the counter-bore 1008 to the other face of the internal flange 1018 is a compression spring 1030. The outer cylindrical surfaces of the skirt 1010 and of the guide 1016 are fitted for sliding and for rotation within a pair of bushings 1036, 1038 secured in a bore 1040 of the upper portion 882 of the carrier 810. Co-rotation of the stripper 1012 and its guide 1016 with rotation of the punch assembly, in the manner to be described, is assured by the snug fit of the punch 1002 within the stripper 1012 and by the frictional engagement of the flange 1018 and face 1022.

The die assembly 1050 of the rotatable punch and die set 872 includes a die button 1051, conjugate in form to its associated punch 1002, which is supported by the die support 1052 having a female screw thread receiving a male threaded coupling 1056 having a flange 1058. (Relative rotation of the two threaded members 1052, 1056 provides adjustment of the height to which the die button 1051 is supported in the die assembly to provide for the regrinding of the die button 1051 as required.) The die support 1052 is received within a flanged bushing 1062 and has a key 1064 slidable in the key way 1066 in the flanged bushing 1062. The flanged bushing 1062 is counter-bored to receive the flange 1058 of the coupling or bushing 1056 and a flange of the support ring 1068. The support ring 1068 is in turn secured to the flange 1070 of the bushing 1062 by cap screws so that the ring 1068 clamps the coupling flange 1058 against the counter-bore seat 1074 to prevent relative movement therebetween. The bushing 1062 is rotatably received in sleeve 1076 seated in the bore 1078 in the portion 886 and coaxially with the bore 1040.

Secured to the punch assembly 1000 by cap screws is a gear 1080 rotatably meshed with an anti-backlash type driving gear 1082 mounted upon a jack shaft 1084 carried in bearings 1086, 1088 seated in a bearing block 1090 affixed to the carrier 810. A substantially identical anti-backlash gear 1092 is mounted at the other end of the jack shaft 1084 which gear 1092 in turn engages a gear 1094 co-rotatably affixed to the die support ring 1068 of the set 872.

The jackshaft 1084 also carries, co-rotatably mounted thereon, the bevel gear 1096 which is drivingly engaged by the bevel pinion 1098 on a bevel pinion shaft 1100 rotatably supported by a pair of bearings 1102 in the bearing housing 1106 affixed to the tool carrier 810. The bevel pinion 1098 is drivingly connected by a floating drive shaft 1110 with flexible coupling 1111 to a shaft extension 1112 provided in the bending device 820 to be described in more detail below.

The punch and die set 871 has an anti-backlash gear 1120 co-rotatably affixed to its punch assembly 1122 (which is identical to the punch assembly 1000, except as noted) in meshing engagement with the gear 1080. The die support ring 1124 of the die assembly 1126 likewise has an anti-backlash gear 1128 drivingly engaged with the gear 1094 on the support ring 1068. The arrangement insures that the punch and the die of a particular set can be rotated through the same angular displacement. By rotating the punch and die set the sidewalls of a notch or projection in a particular blade may be formed at any desired angular relation with the Y axis; large radii may be cut; and the versatility of the apparatus is increased.

Return of the punch assemblies 1000 and 1122 to a rest or idle position following actuation is provided by the spring loaded plungers 1140 bearing on the gears 1080 and 1120 so as to urge the punch assemblies 1000 and 1122 upward to rest against the stop buttons 1148 carried by the stop blocks 1150. Except as noted, the die assemblies 1050 and 1126 are identical.

The spring 1152 urges the die support ring 1068 and the die assembly 1050 upward into the carrier portion 886 slightly to insure that the die support ring 1068 can pass freely over the anvil 142. It is a feature of the present invention that any number, including none, of the rotatable die sets may be used and placed in any position in the carrier. In the present embodiment two die sets have been found advantageous, the punches being conjugate respectively with the mating dies and having the forms shown in FIG. 21 at stations L and M.

As will become apparent later herein, it is within the scope of the present invention, and within the capability of the apparatus provided thereby, to employ one or more punch and die sets to nibble material from the strip being processed. It is a particular advantage that repeated strokes of a particular set can be occasioned by actuating means in response to the command signals communicated thereto and can create outline shapes in blades or like parts which are not limited to the shapes conjugate to the particular punch configurations shown but which shapes may be made up of a plurality of incremental cuts of the material of the strip.

It will be evident also that the outline of the punch and of the matching die of any rotatable set, according to the present invention, may be of any configuration; full advantage of the rotation feature, however, is achieved with punch and die configurations which are other than circular, i.e., any non-circular configuration, examples of which are shown at stations L and M of FIG. 21.

The Cut-Off Assembly

Figure 25:
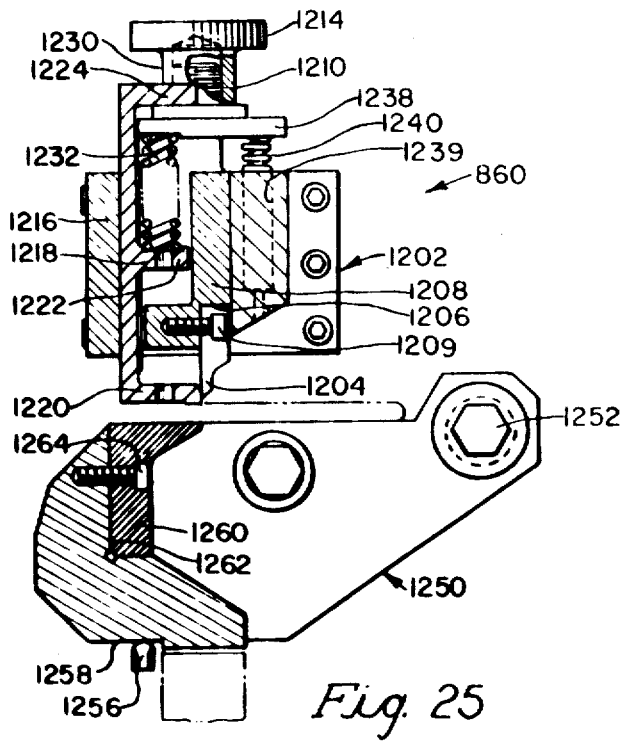
FIG. 25 is a sectional view of the cutting-off device of the apparatus of FIG. 1, taken as indicated by the line 25—25 of FIG. 20.

Making reference now to FIG. 25, the tool carrier 810 at Station A also supports means for severing the free end E, in the form of the cut-off assembly 860. The cut-off punch portion 1202 thereof is carried by the upper portion 882 and includes the shear or punch 1204 secured in the seat 1206 of the punch holder 1208 by cap screws 1209. The threaded stud 1210 of the holder 1208 is secured in the mating threaded hole in the head 1214. The holder 1208 is slidably received in the body 1216 which also slidably receives the stripper member 1218 having a foot 1220, an intermediate flange 1222 and a terminal flange 1224 disposed between the faces of an annular groove 1230 in the head 1214. A pair of compression springs 1232 extend between the face of the intermediate flange 1222 and a pressure plate 1238 loosely fitted around the stud 1210 beneath the head 1214. The counter-bore 1239 in the body 1216 receives therein a compression spring 1240 bearing on the plate 1238.

The cut-off die portion 1250 of the assembly is mounted on the lower portion 886 of the carrier 810 by and for pivotal movement about the shoulder screw 1252 and is secured by the retaining screw 1254. The cantilever spring 1256 affixed to the lower carrier portion 886 bears on the lower surface 1258 of the cut-off die portion 1250. The cut-off die or shear 1260 is removably fixed into the seat 1262 by the cap screw 1264.

Tool Positioning Drive

At the left end of the frame member 106, as seen in FIGS. 3, 19 and 20, the traversing or positioning drive means 180 includes a hydraulic motor 1300 supported by the end wall 1302. The output shaft 1304 of the motor is connected by a zero backlash flexible coupling 1306 to the drive end 1310 of a precision ball lead screw 1312 which is supported for rotation without axial movement in suitable bearings (not shown) mounted within the housing 1318 of the frame member 106. The threaded portion 1320 of the lead screw 1312 is threadedly engaged by a precision ball screw nut 1322 affixed to the bracket 824 of tool carrier 810. The opposite end 1324 of the lead screw 1312 is supported by an outboard bearing 1326 carried in the bracket 1328 supported from the frame 106.

Movement of the plurality of tools along the X axis is precisely controlled by the drive means 180 through the engagement of the ball nut 1322 with the ball lead screw 1312 in substantially infinitesimal increments from the position shown in FIG. 3 where the bracket 830 engages a cushion stop member 1330, limiting over-travel toward the left, as seen in the figure, and a position to the right where the bracket 832 of the carrier means 810 engages a similar cushion stop member 1331. The two limit positions described are spaced sufficiently apart so that any individual tool can be positioned precisely with respect to the Y axis and to the free end of the strip as the latter is positioned by the Y axis component of the machine tool. As previously noted herein, the bending device 820 is maintained in spaced relation with the carrier 810 and is also moved along the X axis by operation of the lead screw 1312 and nut 1322.

The Bending System and Device

Of the plurality of tools contemplated by the invention to shape the free end of a strip, one is a bending device. Shown in FIG. 3, the bending device 820 is connected to the carrier 810 by the tie bar 822 for movement on the track means of the frame member 106 in spaced relation to the carrier 810. A preferred form of the bending device 820 is shown in greater detail in FIGS. 26. 27, 28, 29 and 30.

The body or housing 1350 of the device 820 s provided with a flange 1352 having a pair of cam rollers 1354 engaging the channel 800 and with a pair of foot brackets 1356 each having a slipper bearing 1360 mounted to slide along the guide bar 802.

The Finger Extending Mechanism

The bending device 820 also includes means for extending and retracting a finger and means for rotating the finger about an axis transverse to the Y axis. Means for extending the finger, referring to FIG. 28, includes a head 1400 mounted rotatably in suitable bearings 1402, 1404 in the housing 1350; means for adjusting the finger to and away from a predetermined spacing or distance from the axis 1414 includes a pair of slideways 1406, 1408, each receiving respectively one of an allochiral pair of bending fingers 1410, 1412 for sliding movement therealong. The slide-ways 1406, 1408 are oriented at slight angles equal and opposite with respect to the rotational axis 1414 of the head 1400 and specifically at slopes of approximately 1 to 8.

It will be appreciated that other expedients may be substituted to provide the requisite adjustment of one or both of the fingers 1410, 1412 in distance from the rotation axis 1414. For example, the invention also contemplates use of a series of preadjusted fingers which can be selectively secured in a bending device. Each of the fingers 1410, 1412 is provided along one of its sides with a gear rack 1416, 1418, each of which racks engage a rack pinion 1420 carried on pinion shaft 1421 mounted in bearings 1423, 1425 in the head 1400 to be perpendicular to the plane defined by the directions of movement of the fingers. The arrangement is such that by rotation of the pinion 1420 one of the fingers 1410, 1412 is extended, along its slide, outwardly from the head 1400 while the other of the fingers 1412, 1410 is simultaneously retracted into the head 1400. A portion of each of the fingers has adjacent its outward end a surface 1422, 1424, respectively, parallel to the axis of rotation 1414 of the head 1400, each of the surfaces 1422, 1424 being engageable with a surface of a free end E of the strip held in the first jaw means 280, previously described. Extending one of the fingers thus moves, or adjusts, the spacing of the finger and the working surface 1422 or 1424 with respect to the axis 1414. Each of the fingers 1410, 1412 is provided with a groove 1426 which receives a spring 1434. The ends 1436 of the springs 1434 engage pins 1438 anchored respectively in the grooves 1426 in such a manner that each of the springs 1434 urges the respective gear rack 1416, 1418 against the rack pinion 1420 during at least a part of the movement of the respective fingers 1410, 1412.

As may be seen in FIGS. 28 and 29, each of the fingers 1410, 1412 is so shaped as to have in its outwardly extending portion, in cross-sections normal to the axis 1414, an outline form including surfaces 1440, 1442 generally normal to the strip engaging surfaces 1422, 1424, a U-shaped clearance groove 1444 having a side 1446 parallel to the outer plane surface 1448 and a side 1450 flared angularly upwardly and outwardly of the bottom 1452 of the U to blend with the surface 1440. From the outer surface 1442 a side 1454, diverging angularly from the first flared side 1444, terminates at the rectilinear surface 1456. The sides 1454, in the rest or O angle position of the head 1400, lie approximately parallel to the respective angular surfaces 398, 399 of the jaws 300, 302. The clearance grooves 1444 permit closely spaced successive upward and downward bends in the end of the strip being processed. It is a notable advantage of the bending system of the present invention that bends can be performed not only in close succession but also either upward or downward, and without it being required to turn the stock strip material over.

The Bending Device

Figure 26:
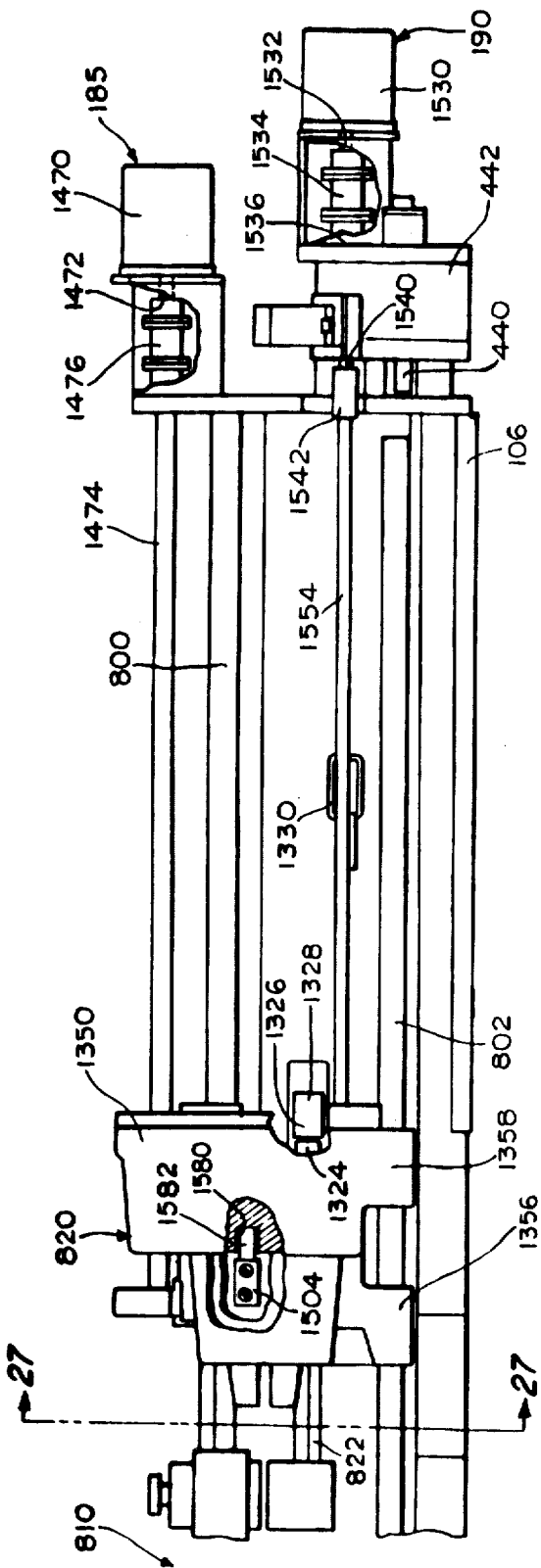
FIG. 26 is an elevation view of another portion of the X axis component of the apparatus of FIG. 1, showing the bending device.
Figure 27:
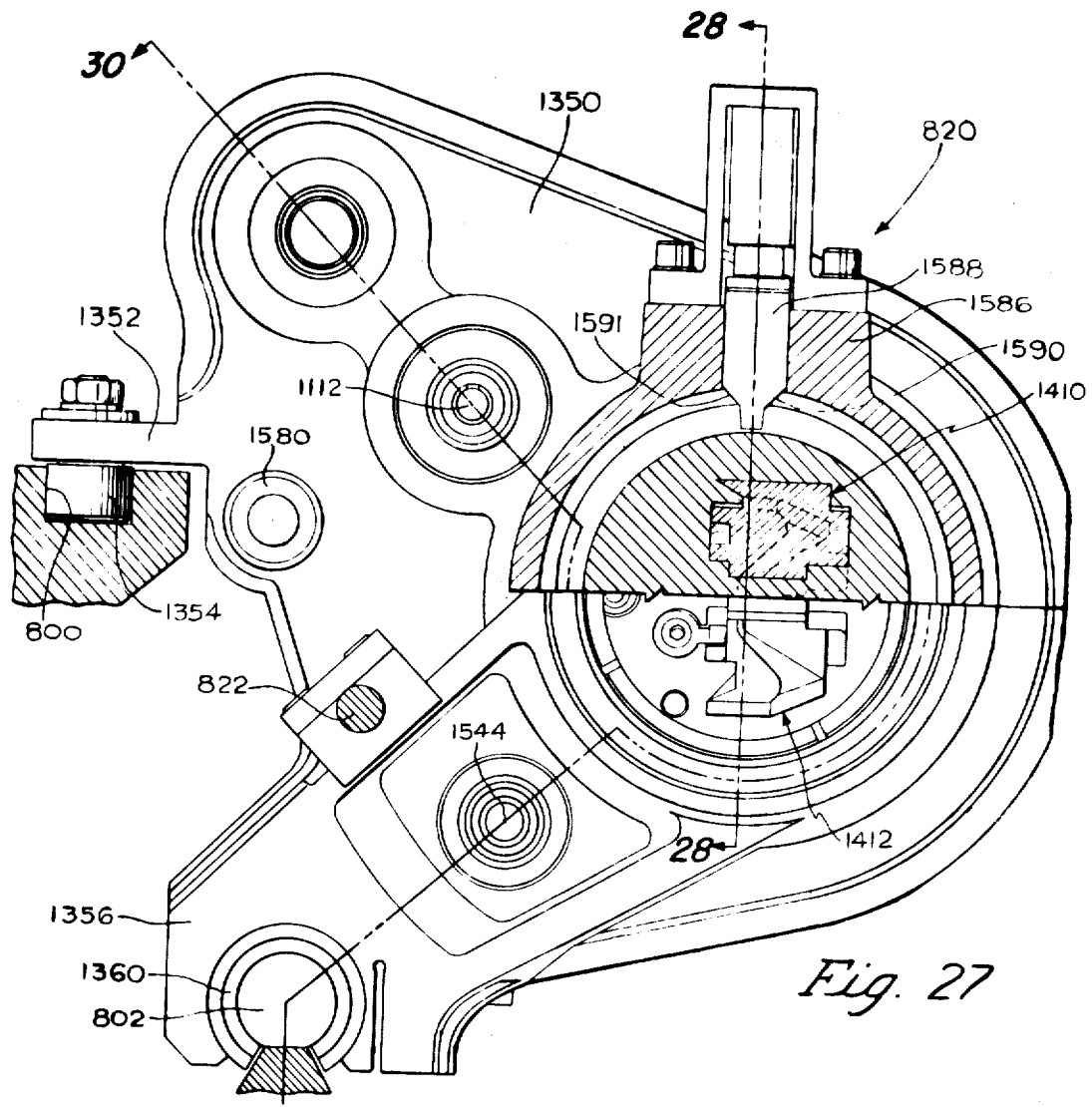
FIG. 27 is an elevation view of the bending device taken as indicated by the line 27—27 of FIG. 26.
Figure 30:
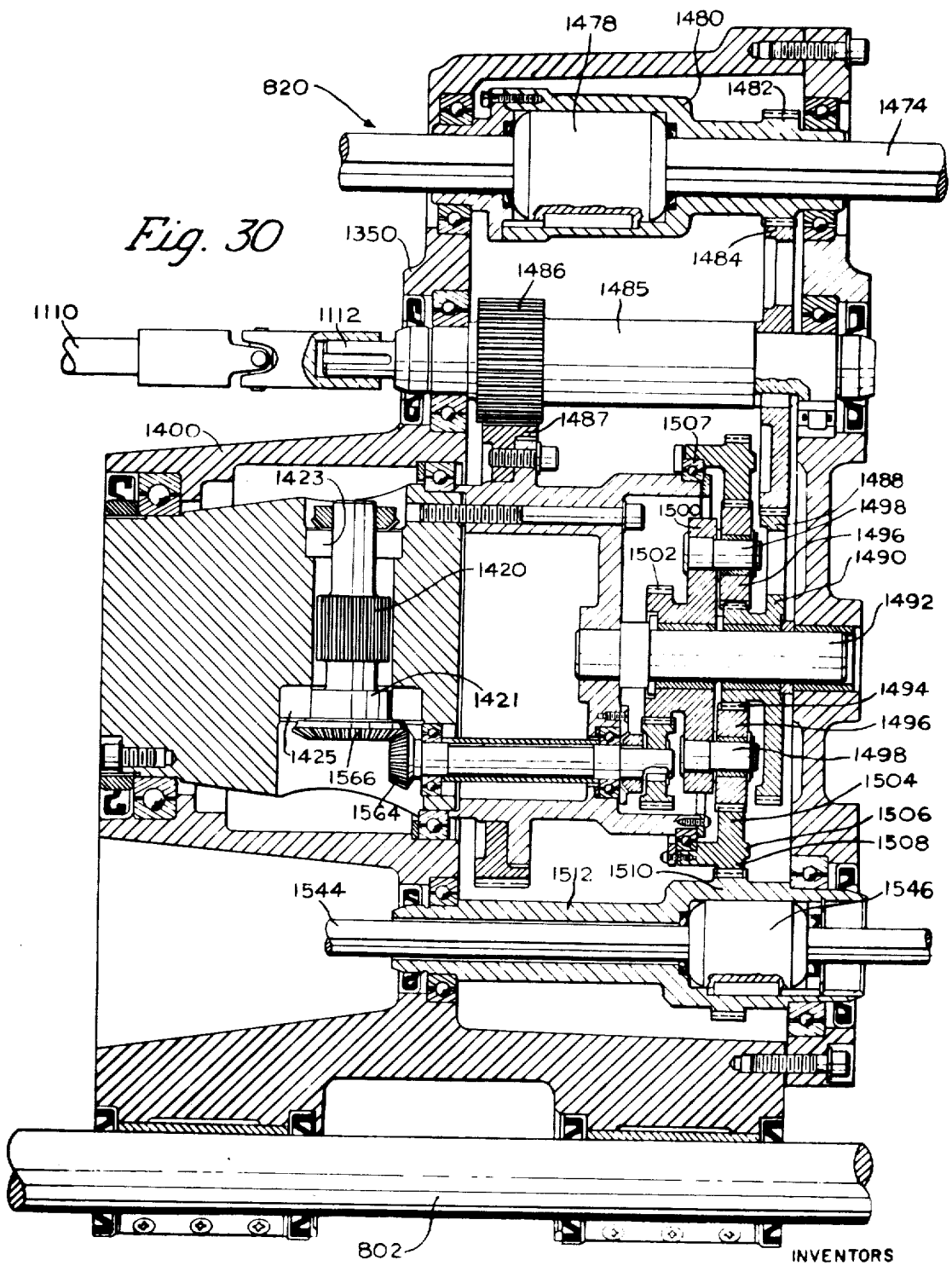
FIG. 30 is another sectional view of the bending device, taken as indicated by the line 30—30 of FIG. 27.

The $a$ axis component includes drive means connected to the bending device to effect rotation of the fingers 1410, 1412 through a predetermined angle about an axis transverse to the Y axis, and comprises an electro-hydraulic servo-drive 185, including a hydraulic drive motor 1470 carried by the frame member 106, as shown in FIG. 26. Referring now particularly to FIGS. 26 and 30, an output shaft 1472 of the motor is coupled to a splined shaft 1474 by a zero backlash coupling 1476. The splined shaft 1474 extends to and is engaged within a ball spline sleeve 1478 for positive co-rotation therewith and for free axially relative movement between the splined shaft 1474 and the sleeve 1478. The spline-sleeve 1478 is fixed within a hollow pinion shaft 1480 mounted rotatably in the housing 1350 and carrying the pinion 1482 which engages a gear 1484 mounted on the intermediate shaft 1485. The intermediate shaft, also rotatably mounted within the housing 1350, carries the pinion 1486 which meshes with the gear 1487 secured to the rotatable head 1400 so that rotation of the splined shaft 1474 causes a rotation of the head 1400 of the same rotational sense as that of the shaft 1474. The intermediate shaft 1485 is provided with a take-off or shaft extension 1112 by which its rotation is communicated to the previously described bevel pinion shaft 1100 of the rotatable punch and die sets 870, 871.

The rotation of the head 1400 in the bending device 820 and the rotation of the one or more rotatable punch sets 870, 871 are in exact timed relation with one another and responsive to the $a$ axis control.

The gear 1484 on the intermediate shaft 1485 also meshes with the gear 1488 on the spool 1490 which is mounted to be freely rotatable upon the shaft extension 1492 of the head 1400 and which spool also carries a pinion 1494 which meshes with the planetary pinions 1496 rotatably mounted on pins 1498 secured in the planet carrier or spider 1500 carrying a gear 1502 and which spider is freely rotatable upon the shaft extension 1492. The planetary pinions 1496 also mesh with the internal gear 1504 of the internal-external gear ring 1506 which is supported by the anti-friction bearing 1507 for rotation on and relative to the head 1400. The external gear 1508 of the ring 1506 in turn engages the pinion 1510 carried by the hollow pinion shaft 1512 mounted rotatably in the housing 1350.

The pinion 1510 being stationary and holding the ring 1506 stationary, rotation of the shaft 1474, and of the head 1400, causes the spool 1490 to rotate, in the same sense as the head; the pinion 1494 on the spool 1490 causes rotation of the planetary pinions 1496 on the pins 1498 and rotation of the spider 1500; the spider gear 1502 then causes rotation of the jack shaft pinion 1514 relative to the housing 1350 exactly equal and opposite to the orbital rotation of the pinion 1514, relative to the housing 1350 induced by the rotation of the head 1400, carrying the shaft 1516 about the axis of rotation 1414 of the head 1400. The arrangement insures that rotation of the head 1400 is fully independent of rotation of the pinion 1420.

As will be apparent from FIG. 28, rotation of the pinion 1420 in its engagement with the respective racks 1416, 1418 of the bending fingers 1410, 1412 will retract one finger and extend the other. Driving means 190 in the form of an electro-hydraulic servo-drive, described elsewhere herein, is connected to the pinion 1420 and operable to extend one and retract the other of the fingers. As shown in FIG. 26, the means 190 includes a hydraulic motor 1530 having an output shaft 1532 which is coupled by a zero backlash flexible coupling 1534 to the input shaft 1536 of the reduction gear set or gear box 442 which is provided with two output shafts. Coupled to the output shaft 1540 by a zero backlash flexible coupling 1542 is a second splined shaft 1544 which extends to and is slidably received within a ball-spline sleeve 1546 and is positively co-rotatable therewith. The sleeve 1546 is keyed for co-rotation with the hollow pinion shaft 1512, the pinion 1510 of which engages the external gear 1508 of the ring 1506 carried by and rotatable relative to the bending head 1400. The internal gear 1504 of the gear ring 1506, as before, is engaged with the planetary pinions 1496 carried on the spider 1500 which carries the gear 1502. The splined shaft 1474, intermediate shaft 1485, the spool 1490, the gear 1486, and the head 1400, being stationary, planetary pinions 1496 and the spider 1490 are caused to rotate by rotation of the splined shaft 1544, pinion 1510, and the gear ring 1506 so that gear 1502, in mesh with pinion 1514, causes rotation of the bevel pinion shaft 1516, the bevel pinion 1564, the bevel gear 1566, the rack pinion shaft 1421, and its pinion 1420. Depending upon the direction of rotation of the shaft 1544, one of the fingers 1410, 1412 is extended while the other finger 1412, 1410 is retracted respectively outward from or into the bender head 1400.

As will be evident from the foregoing description, the bender head 1400 and its drive shaft 1474 are maintained in constant timed relation one to the other. The rack pinion 1420 and the bender finger extension splined drive shaft 1544 are maintained in constant timed relation one to another. The differential gear action, provided by the floating ring 1506 with gears 1504 and 1508 and the planetary train described, operates to maintain both constant relationships and provides means to prevent rotation of the rack pinion 1420 about its own axis during the rotation of the bender head 1400 so as to maintain the extension of one or the other finger a predetermined amount, while at the same time enabling the rotational movement of the bender head 1400 or the extensional movement of one of the bender fingers 1410, 1412 independently of one another.

As has been noted in connection with FIG. 23, the tool carrier includes rotatable punch and die sets 870, 871 rotatable by the rotation of the bevel pinion shaft 1100. The arrangement described has the advantage of dual use both of the drive motor and the control means therefor, eliminating an independent drive and control to the rotatable punch and die sets.

A notable advantage obtained by mounting each of the drive means stationary on the machine tool is the elimination of troublesome flexible hydraulic and/or electrical connections which would otherwise be required if drive means were mounted for movement together with the carrier being moved. The arrangement permitting the conjoint movement of the tools on a common slide permits the use of a single drive means to position the selected tool as required with respect to the strip material and the Y axis. The use of splined shafts slidably received in the sleeves as described likewise enables the motive means to remain fixed with respect to the machine frame during movements of the tool carrier and the bender device.

To provide increased rigidity and to resist the reactive torque resulting from the resistance to bending by the strip material, the housing 1350 of the bending device 820 is provided with a bushing 1580. As the bending device 820 is moved into its position proximate the free end of the strip, as shown in FIG. 26, preparatory to bending the strip either up or down, the pin 1582 secured to the tool slide frame 106 by the bracket 1584 enters snugly into the bushing 1580.

The housing 1350 includes over-travel safety means including a boss 1586 in which is secured a spring cushioned limit stop plunger 1588 having angularly disposed end surfaces 1590, 1591. The rotatable head 1400 carries a lug 1592 engageable with the surfaces 1590, 1591. Rotation of the head 1400 in one or the other direction through its maximum angle, brings the lug 1592 against one of the surfaces 1590, 1591 of the plunger to prevent accidental over-travel.

The Control System

Figure 31:
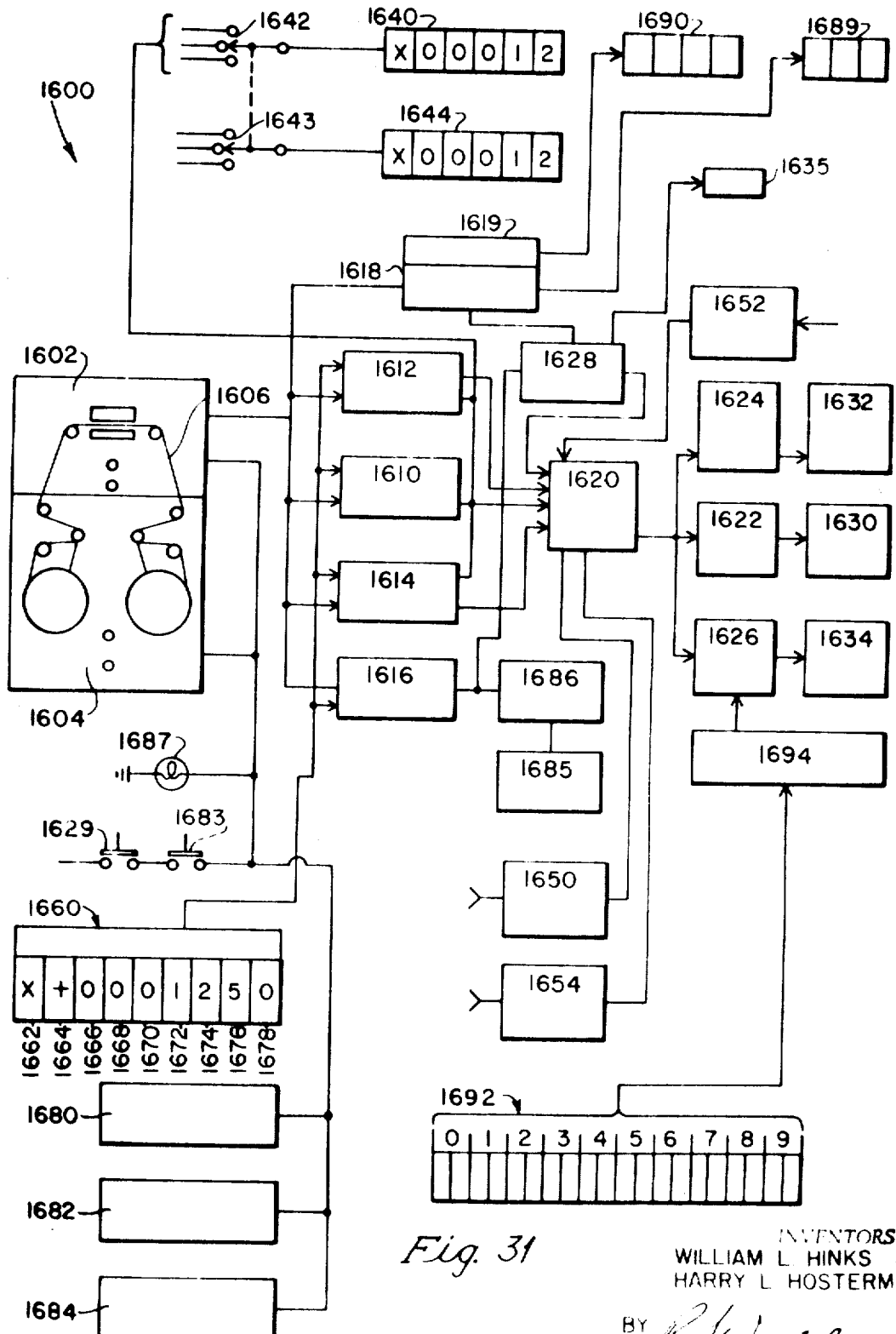
FIG. 31 is a schematic diagram of means for storing and communicating signals, according to the invention.

In accordance with the invention the apparatus includes means for storing and communicating a predetermined sequence of command signals to the several components of the machine tool, including the strip material positioning means (Y axis component), and the tool positioning means (the X axis component). Shown in FIG. 31, the means for storing and communicating command signals here includes the numerical control (NC) unit or device indicated generally by the numeral 1600. The NC unit 1600 includes an eight channel tape reader 1602 and spooler 1604 available commercially under the name Remex, from Datex Division, Conrac Corporation, previously identified. The device 1600 provides means or memory device for storing a prepared program including a predetermined sequence of perforations in the tape 1606 which are detected or read by the reader 1602 as electrical energy pulses or information bits and are communicated, in the sequence dictated by the particular program, to the command registers 1610, 1612, 1614, respectively, communicating with the Y axis, or stock positioning component, the X axis or tool positioning component, and the $a$ axis or bending component of the machine tool 100. Information bits are also communicated from the tape reader 1602 to a miscellaneous function register 1616 and to a part identification control register 1618 which includes a counter 1619. Still in digital form information bits from the respective command registers 1610, 1612, 1614 are communicated to an adder/subtractor or computer 1620 from which the signals are relayed to the digital-analogue converters 1622, 1624 and 1626, respectively, for the X, Y, $a$ axis components as controlled by the operation programmer or main program counter 1628 which cycles through a main program sequence including, in the present embodiment, a twelve step program. When the start button 1629 is depressed, the operation programmer 1628 accepts signals from the tape reader 1602, communicates signals into the command registers 1610, 1612, and 1614 in response to or in conjunction with signals in the miscellaneous function register 1616. The programmer 1628 responds to feedback or move-completion signals from the several components of the apparatus so as to control the sequences of motion. The computer 1620 includes a control circuit combination permitting simultaneous positioning movement of the three control axes Y, X, and $a$. From the converters 1622, 1624, and 1626 command signals received therein in digital form from the computer 1620 are communicated in analogue form to the control circuits 1630, 1632, and 1634, respectively, commanding the movement of the Y, the X, and the $a$ axes which control circuits are more fully described and shown in FIGS. 32, 33 and 34 herein. A move-edit switch 1635 provides for movement of the several machine components or alternatively for cycling the control unit without physical movement of the machine components.

The numerical control unit 1600 includes also a command position display or read-out 1640 which is connected selectively with one of the command registers 1610, 1612, 1614 by operation of the selector switch 1642 which is mechanically connected with a selector switch 1643 operative to connect the actual position display or read-out 1644 with the one of the axis translators 1650, 1652, 1654 communicating respectively with the Y, X, or $a$ component. A command position dial input 1660 comprising axis selector switch 1662 operative to control the position of switches 1642, 1643, the position-direction selector switch 1664, the position coordinate number selector switches 1666–1674, and the bend off-set selector switch 1676 is connected to the command registers 1610, 1612, 1614 through a mode selector switch 1678 providing alternatively for communicating command signals into the command registers 1610, 1612, 1614, and the miscellaneous function register 1616 from the tape reader 1602 or from manually input commands applied at the dial input 1660. A sequence of signals may be displayed as a numerical coordinate including direction and axis selected in the display 1640.

The unit 1600 also includes a plurality of regulated voltage power supply means furnishing independent voltage levels, respectively, the digital power supply 1680, the operational power supply 1682 and the solenoid drive power supply 1684. Start and stop controls 1629 and 1683 respectively provide, in addition to conventional main supply power on and off control (not shown) for starting and for stopping the blade making program or other operation of the control unit 1600. A lamp 1687 represents a plurality of safety and/or program function indicator lamps which may be desired.

A program for a particular blade which is carried on tape 1606 will normally include an order quantity to be made, signals for which quantity are communicated to the miscellaneous function register 1616. A blade quantity multiplier switch 1685 and a multiplier counter 1686 are also in communication with the miscellaneous function register 1616 and with an operation programmer 1628 which functions to sequence command signals in response to feed-back, null, or completion signals received from the axis translators by the computer 1620 and communicated to the computer 1620 from the registers. The control register 1618 also receives a designation of the type of blade for which the program calls from the tape reader 1602. This designation is displayed in a three-digit display 1689. The counter 1619 is connected with a blade quantity display 1690 which includes four digit display positions, the first of which displays a quantity multiplier pre-set by the multiplier switch 1685 and the remaining three digit positions which display the quantity required of the blade called for by the particular program being operated.

The program contained in the tape 1606 for making a particular blade will include a pluarlity of command signals, one set for each shaping operation including one set for each successive bend. Blade making stock may require compensation for spring back due to the variations from one length or lot of stock to another. A plurality of bend off-set dial switch-s 1692 provide means for compensating the program-commanded angle of bend for each successive bend in a particular blade. The bend off-set selector dial switches 1692 communicate with a bend off-set control or tool off-set memory 1694 in which the amount of compensation for each successive bend, manually inserted to the switches 1692, is stored and communicated to the digital analogue converter 1626. Manual insertion of minor correction to a program affecting one or more of the other axes of control may be provided for by addition of circuit components like the register 1694 and the dial switches 1692 to the respective converters 1622, 1624, and 1626.

Positioning Servo-Drive Means

A feature of the present invention is the control of positioning movement of the X, Y and $a$ components of the machine tool. In the present embodiment the means for positioning include means for controlling the rate of movement of the positioning means, and particularly of the rate of acceleration or deceleration of the positioning means being traversed to a selected predetermined position.

Figure 32:
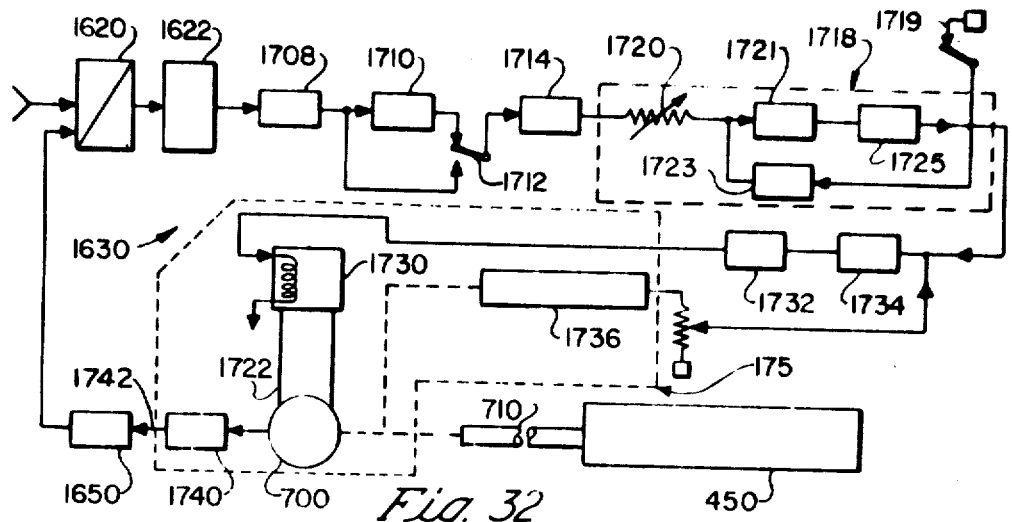
FIG. 32 is a schematic diagram of the control system for the Y axis component of the apparatus of FIG. 1.

As is shown schematically in FIG. 32, means for controlling the movement of the carriage 450, and particularly the rate of movement thereof, includes the previously referred to circuit 1630 which controls the operation of a hydraulic motor 700 in response to signals from the control unit 1600. The circuit 1630 comprises signal amplifiers 1708 and 1710 which are made alternatively responsive to the positive or negative sign of the received signal by operation of the error polarity switch 1712. A signal in the form of voltage proportional to the digital counts received by the converter 1622 from the comparator or computer 1620 is impressed on the circuit 1630. The signal, amplified in voltage by the amplifiers 1708 and 1710, is applied to an amplifier 1714 having a compensating network including a Zener diode and thence to an integrator loop 1718 which includes a gain control 1720 and a dual gain amplifier circuit having the amplifiers 1721, 1723 and 1725, the dual gain being afforded by compensation network including a Zener diode which become conductive at a signal voltage proportional to a displacement of the carriage of about 0.15 inch from a commanded position. The increased gain applied to the signal received by the integrator loop 1718 during carriage movement in the interval between 0.15 inch displacement and null, or between an actual position and the commanded position, provides increased sensitivity in the control circuit and a more positive null as the carriage is driven to the commanded position. The circuit gain from amplifier 1714 through the amplifier 1734 operates at saturation with error signals proportional to 1.0 inch from the command position and as much as 2.0 inches displacement at saturation can be utilized. Between 1.0 and 0.15 the compensation network of the circuit will provide a lesser gain. Output of the integrator loop 1718 is prevented, in the absence of a command signal from the control unit 1600, by the switch 1719 which connects the terminal of the loop 1718 to zero.

The circuit 1630 operates to control the hydraulic motor 700 of the servo-drive 175 which, as previously discussed herein, is coupled to the lead screw 710 for imparting positioning movement to the carriage 450 toward and away from the X axis. The control or servo-valve 1722 regulates fluid flow to and from the hydraulic motor 700 in proportion to the current in the valve operating coil 1730, which current is controlled by the coil driver 1732 in proportion to the voltage impressed thereon by the amplifier 1734. Voltage applied to the coil driver 1732 and coil 1730 is so modulated that an electrical null is reached and the valve 1722 moved into zero flow condition at the commanded position, stalling the hydraulic motor with a locked in column of fluid substantially at the maximum available pressure at both inlet and outlet, when the commanded position is reached.

Mechanically connected to the motor 700 is a tachometer generator 1736 capable of producing a voltage proportional to the speed of rotation of the motor and thus also proportional to the rate of movement of the carriage 450, the polarity of the tachometer voltage being opposed the voltage of the signal impressed on the amplifier 1734, thus affording decelerating control of the motor 700 as a null is approached.

Also coupled mechanically to the motor 700 sensing means or a transducer which here is an encoder 1740 which emits a signal representative of the position or the displacement of the carriage 450 with respect to a referenced position. The encoder 1740 of the present embodiment is capable of emitting signals, each of which is uniquely representative of a single position of the carriage 450. Signals from the encoder are conveyed by a multi-conductor cable 1742 to the axis translator 1650 and thence to the computer 1620 in which the difference between the commanded and the actual positions operates to produce the voltage signal applied to the amplifier 1708.

The command signal is an analogue of a displacement error representing the algebraic difference between the position command, held in the register 1610 as applied thereto from the program tape 1606 or by means of the dial inputs 1660, and the actual position at any instant of the carriage 450.

Control of the acceleration of the motor is accomplished by resistance-capacitance input circuits in the amplifier or integrator loop 1718 such as to increase the time shape of the response curve and interval during which the servo-valve is being opened in response to a command signal.

As will be evident to persons skilled in the art, the circuit 1630 includes two servo-control loops. The rate control loop provides a feedback from the tachometer 1736 by which the signal input to the amplifier 1734 is modified. The position control loop affords a feedback from the position transducer or encoder 1740 to the computer 1620 of the control unit 1600 to modify the input thereto and thus the analogue signal communicated therefrom to the amplifiers 1708 and 1710.

Figure 33:
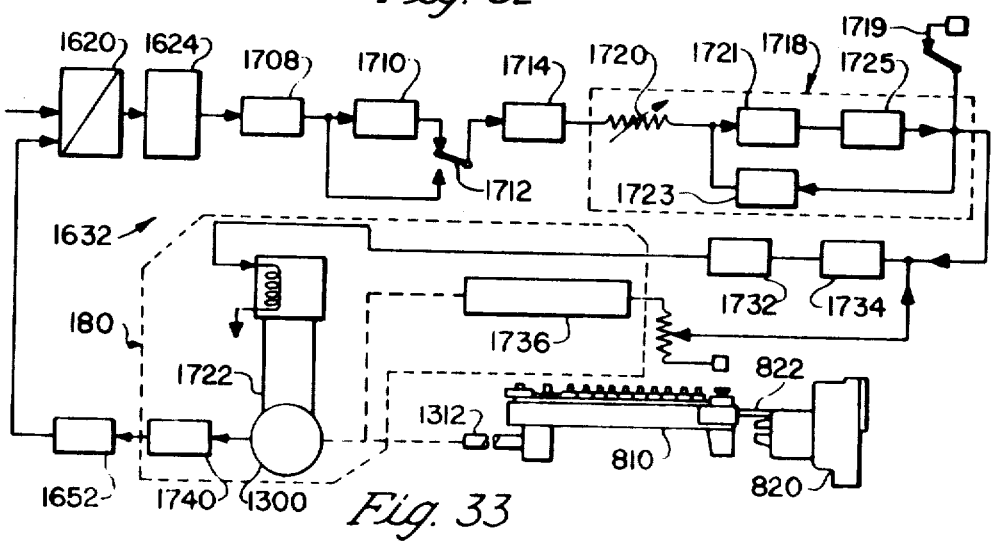
FIG. 33 is a schematic diagram of the control system for the X axis component of the apparatus of FIG. 1.

As may be seen in FIG. 33, the control circuit 1632 is, in all material respects, like the circuit 1630 just described (reference numbers for like parts are identical) and is operative to drive the hydraulic motor 1300 of the positioning drive means 180. As has been described, the motor 1300, by its rotation of the lead screw 1312, positions the carrier 810 and the bending device 820 with respect to the Z and Y axes in response to command signals from the unit 1600.

Figure 34:
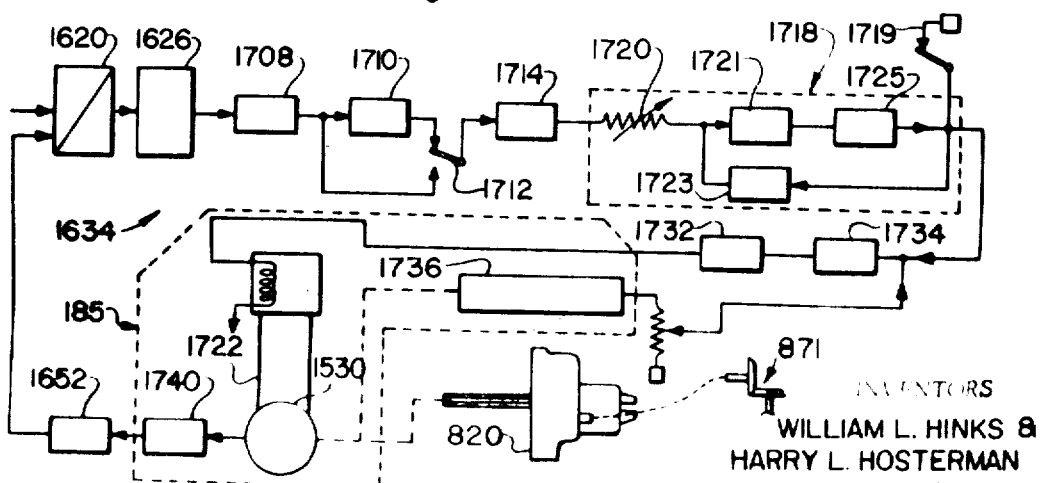
FIG. 34 is a schematic diagram of the control system for the $a$ axis component of the apparatus of FIG. 1.

As shown by FIG. 34, the circuit 1634, is likewise in all significant respects, like the circuits 1630 and 1632, the same reference numerals indicating like elements in the respective figures. As described hereinbefore, the motor 1530 of the servodrive 180 is operative to rotate the bending fingers of the device 820 about its axis 1414, and simultaneously, the rotatable punch and die sets represented by the set 871.

The servo-drive means 175, 180, and 185 are available commercially from the Datex Division, Conrac Corporation, previously identified herein, as the "-Pegasus Electro-Hydraulic Servo-Drive" and include the Pegasus Model 130A servo-valve, the Hartman HT-10 hydraulic motor, the Datex 13–506–3 Encoder, and the Servo Tek SA-740B-1 tachometer. In the apparatus 100 being described the servo-drives have the capability of moving the carriage 450 and the carrier 810 at 1500 inches per minute or more, with very satisfactory repeatability of positioning.

A particular advantage achieved by the present invention is the reduction to a substantially constant minimum the time required for position feedback to the control unit 1600 from the encoder 1740. It will be evident from the foregoing description that very small increments of time loss in each movement of the carriage or of the carrier will result in an appreciable increase in the time required to complete a typical blade. The position sensing means operatively connected to the drive means for positioning the carriage 450, the carrier 810 and the bending device 820, comprises the position transducers or encoders 1740 which are capable of emitting a signal in the form of a coded array of pulses unique to any single position of the connected drive means. The time required to communicate the actual position signal to the NC unit is therefore a minimum and substantially constant, rather than variable and increasing with the displacement of the positioning means from some zero position. Moreover, it is not required that the encoder be re-zeroed after a normal shut-down of the apparatus.

Finger and Jaw Control System

Figure 35:
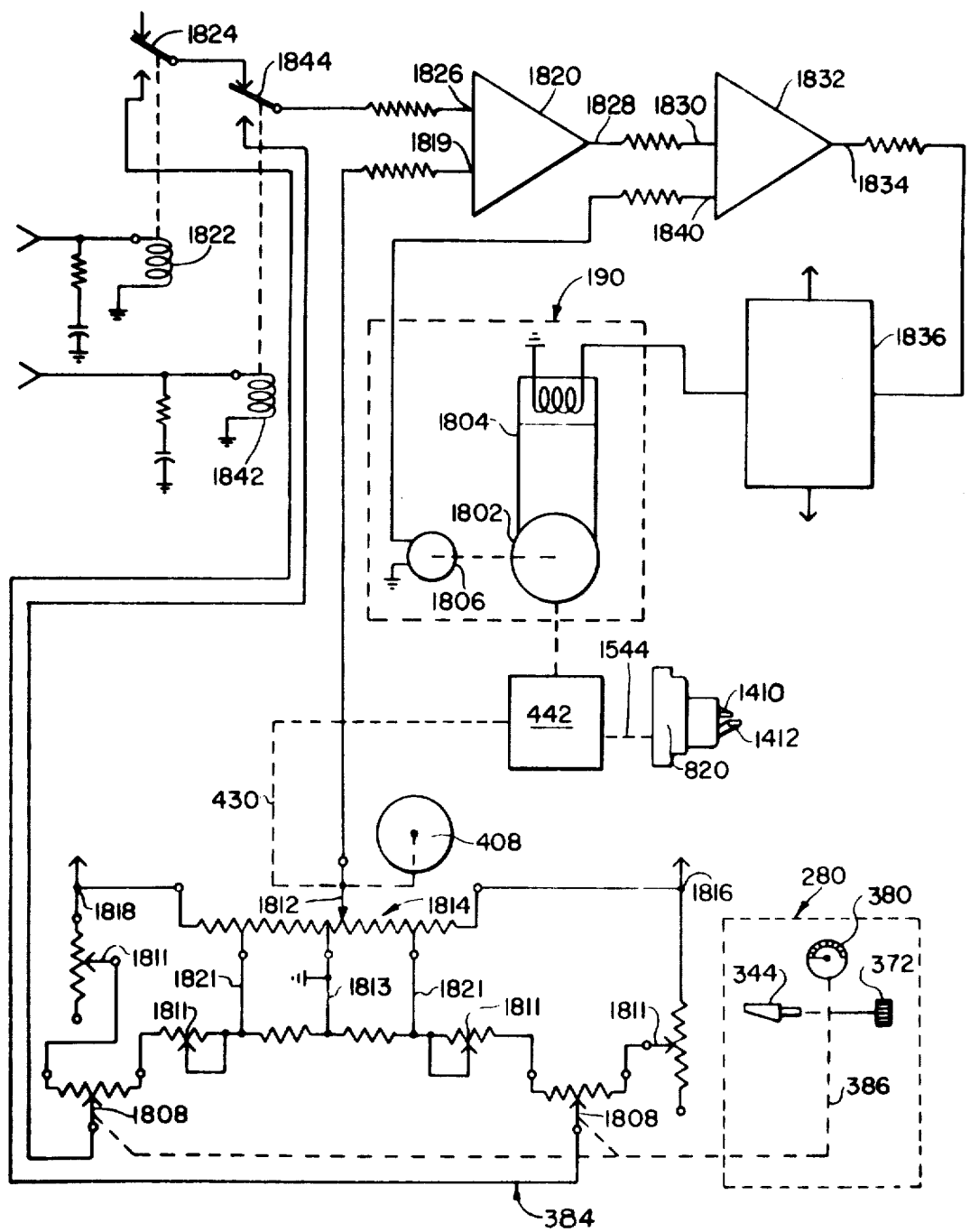
FIG. 35 is a schematic diagram of the control system for the finger and jaw means of the apparatus of FIG. 1.

According to the invention, the hereinbefore described bending device 820 includes a pair of stock engaging fingers 1410, 1412 alternatively extendible from and retractable into said device and driving means connected to said fingers operable to extend one and retract the other of the fingers. The mechanical train portion of the driving means has been described. According to a further aspect of the invention, the extension and retraction of the fingers is responsive to command signals from the means 1600 for storing and communicating such signals. In the apparatus 100 being described, and as shown in FIG. 35, means 190 for controlling the extension and retraction of the bender fingers 1410, 1412 comprises an electro-hydraulic servo-drive including a hydraulic motor 1802, a modulating servo-valve 1804 and a tachometer 1806. Output of the hydraulic motor 1802 is connected, as previously described, to the finger position gear train by the splined shaft 1544, output of the motor 1802 is also connected to a reduction gear set 442, the output of which is communicated to an elevator cam 408 by the floating drive shaft 430. As has been indicated heretofore, the first jaw means 280 includes a stock thickness adjustment means comprising a thickness adjusting knob 372 adapted for manual adjustment, as previously described, and which is mechanically connected to the variable shaft 386 carrying the variable position center taps 1808 of a multiple ganged potentiometer 384 each resistor of which is provided with a trim potentiometer or trimming resistor 1811. The thickness setting of the knob 372 corresponds to a particular setting of the potentiometer 384 and the voltage at one or the other of the variable taps 1808, thereof.

The elevator or thickness cam adjustment 400, as previously described herein, provides means for adjusting the elevation of the Y axis component in accordance with the thickness of the strip material to be bent and as dictated by whether a particular bend will be made upward or downward. The cam 408, as well as the fingers 1410, 1412, are mechanically connected to the variable tap 1812 of a second potentiometer 1814, the terminals 1816, 1818 of which are common with the terminals of the ganged potentiometer 384. A positive voltage (+V) is connected to one terminal 1816 while a negative voltage (−V) is connected at the other terminal 1818. The voltages +V, −V, positive and negative, are communicated to the potentiometer terminals from the operational amplifier power supply 1682 which is part of the control unit 1600. The variable tap 1812 of the potentiometer 1814 is mechanically linked to the fingers 1410, 1412 and to the elevator or thickness cam 408 such that the position of the cam, and of the first jaw means 280 previously described, is a function of the displacement of the variable tap 1812 with respect to its null position. From the variable tap 1812 of the potentiometer 1814 a voltage is communicated to one input 1819 of an operation amplifier network 1820 which voltage is representative of the position at any instant of the thickness cam 408 and of the fingers 1410, 1412. Shunts 1821 are provided at about two-thirds of the travel or voltage length of the potentiometer 1814 to enhance the precision of the outer portions of the variable tap 1812 travel, while providing for control throughout the travel range therebetween. The centers of potentiometers 384 and 1814 are connected at zero potential by the connector 1813.

Upon receiving a command signal from the numerical control unit 1600 commanding an upward bend, the relay 1822 closes the switch 1824 to apply to the other terminal 1826 of the operational amplifier network 1820 a voltage representative of the elevation to which first jaw means 280 (and the upper surface of the free end of the strip held therein) should be brought and to which the finger strip surface 1424 of the finger 1412 should be brought, to initiate the desired upward bend in the free end of the strip being processed. The output 1828 of the operational amplifier 1820 is fed to an input 1830 of a second amplifier 1832, the output 1834 of which is applied to the servo valve coil driver 1836 which is operatively connected to the hydraulic servocontrol valve 1804 through which fluid flows to the motor 1802 to drive the splined shaft 1544 to extend one of the bending fingers 1410, 1412. The electro-hydraulic drive 190 includes the generator or tachometer 1806, the output of which is a voltage proportional to the revolutions per minute of the motor 1802. This voltage is communicated to the input 1840 of the amplifier 1832, the output 1834 of which is thereby caused to decay as the tachometer voltage is increased so as to maintain control of the rotational speed of the hydraulic drive in a manner analogous to that of the rate control loop of the circuit 1630 previously described. As the finger 1412 is moved the elevator or thickness cam 408 is rotated by the drive described, the center tap 1812 of the potentiometer 1814 is displaced to alter the voltage which is applied at the input 1819 of the amplifier 1820. As this voltage approaches the voltage received at the other terminal 1826 from the potentiometer 1810 the amplifier output 1828 decays such that the driving voltage received at the servo-valve driver 1836 is reduced smoothly and rapidly to zero as the bender finger 1412 and the cam 408 arrive at their null positions responsive to the command signal received from the numerical control unit 1600, as modified by the thickness knob setting.

On receipt of a command signal from the numerical control unit 1600 dictating a bend downward in the free end of the strip being processed, the sequence of operation in the circuit described is substantially similar except that the relay 1842 causes the switch 1844 to close, applying a voltage opposite in sign, to that applied for an up-bend, to the input terminal 1826 of the differential amplifier 1820 and the voltage received by the servo valve driver 1836 from the amplifier 1832 is opposite in sign thereby causing rotation of the hydraulic motor 1802 and of the connected tachometer 1806 in the opposite sense. The bend-downward finger 1410 is extended while the bend-upward finger 1412 is correspondingly retracted. Simultaneously the cam 408 is moved to a position suitable for a downward bend responsive to the command signal, and to the stock thickness setting of the dial 374.

As persons skilled in arts related hereto will now perceive, the action of the elevator means, particularly the cam assembly and control means 400, serves to adjust or position the jaw means 280, and particularly the cylinder axes 397, 399 into collinear alignment with the rotation axis 1414. The axis 395 of the lower jaw 300 is adjusted into collinear alignment where the end of the strip is to be bent downwardly; and the axis 397 of the upper jaw 302 is adjusted into collinear alignment with the axis 1414 when the end of the strip is to be bent upwardly. The arrangement provides that the angle to which the strip end is bent can be repeated with great accuracy and that equal increments of angle through which the head 1400 and finger 1410 or 1412 are rotated are directly proportional to equal increments of rotation of the drive 190 over the entire range of bend angle upward or downward.

OPERATION

It will have become apparent from the foregoing that the apparatus is capable of producing tire mold blades and the like continuously and automatically, the blades being successively alike, or different, in shape and dimensions. In normal operation the tape reader 1602 will read out from the tape 1606 a predetermined series, or sequence, of command signals necessary to command the predetermined feeding, clamping, punching, bending, and shearing operations required to alter the shape of the free end E of blade-making stock S to form a complete tire mold blade. The tape reader 1602 is a high-speed read-out using standard 1 inch wide 8 channel tape with flexowriter character set. The tape reader may also provide a part number or like identification of the part to which the particular program on the tape applies and may also include the desired quantity of this part, so establishing the number of automatic repetitions of a particular bead configuration.

The apparatus is connected to supply mains (not shown) for the supply of electrical energy and other utilities in the conventional manner.

Stock or material supply means in the form of a reel 252, FIG. 2, may contain blade-making stock up to 3 inches in width and from 0.010 to 0.080 inch in thickness. The stock may be of materials such as brass or one-quarter hard stainless steel.

The apparatus provides three modes of tape operation: a first mode, called "Dial", provides for operation of the machine cycles by input of commands to the registers 1610, 1612, and 1614 by manipulation of the dial inputs 1660. The apparatus can be cycled step by step, with or without actual physical movement of the carriage or carrier by closure of valve 172. The second mode, referred to as "Tape Step" provides that the tape be read by the tape reader one block at a time during which the apparatus performs the commanded operations from the particular block selected and the system completes that particular sequence of commands, whereupon the system goes to "complete" with the particular sequence of commands satisfied. In the Tape Step mode manual intervention, by pushing the start button, is required to move to the next block of commands on the tape. This Tape mode is of particular use for trouble-shooting and for evaluating a tape the first time it is put on the machine and is used therefore to allow the operator to observe the apparatus operation and to determine whether any faults or mis-commands have been put into the tape.

In the third mode, referred to as "Tape Auto" the machine performs in the same manner as in the Tape Step mode but proceeds automatically to the succeeding block of information or sequence of commands when the next preceding block of command signals is satisfied. Selection of one or an other mode of operation is made by the selector switch 1678.

The tape can be edited or reviewed, in the present apparatus, without having any movements signalled to the drive means of the apparatus by placing the mode selector switch 1678 in the tape step position and the move-edit switch in its edit position. Upon pushing the start push button a first block of information will be read from the tape and the command position for the axis selected by the switch 1662 will be observed in the command position display 1640. Rotation of the axis selector thumb wheel switch 1662 to one of the X, Y and $a$ components will cause the command display selector switch 1642 and the actual position display selector switch 1643 to make contact with the appropriate command register 1610, 1612 or 1614 and the command display will show a numerical coordinate corresponding to the position commanded. The blade type N display 1689 and quantity Q display 1690 will change if the selected block of information contains up-dated signals. The miscellaneous function, M commands, will likewise be read and communicated to the register 1616. The immediately succeeding block of information on the tape may then be reviewed by again pushing the start button 1681. This particular portion of the system provides for review of the tape or portion of the tape programmed for the production of a particular blade type, and is particularly advantageous in trouble-shooting.

The apparatus is further provided with a blade quantity multiplier switch 1685 on the panel of the control console (not shown) and allows the operator the capability of selecting a multiple of the quantity of blades called for on the tape. For example, if a particular blade type described by the tape included a program quantity of 50, the blade quantity or Q display would show the number 050, which number would be reduced by 1 upon completion of each single blade and one pass of the tape through the reader until the number displayed would be 000. With the multiplier switch set at, for example, 5, then the program would be repeated five times, resulting in a total production of 250 blades. With the blade quantity multiplier switch 1685 set at only one lot quantity of blades as called for on the tape would be made, whereupon the apparatus would proceed to the next type of blade called for by the tape program. This feature has the advantage of increasing the utilization of particular taped programs without requiring a complete reproduction of the tape itself.

Having ascertained the operation of the machine and the correctness of the tape by the procedure outlined, a free end E of the blade material S is introduced into the Y axis component of the apparatus, care being taken to see that the stock is free from kinks and blemishes of a sort to prevent free passage into the apparatus. Both the first 280 and second jaw 460 means are opened. The first jaw means or bend jaws 280 normally have only a few thousandths of an inch clearance over the stock thickness. The setting of the stock thickness will be provided by manipulating the stock thickness gage hand knob 372. The clamp 644 is moved free, the upper frame portion 566 of the stock straightener 550 is swung open and the movable guide rollers 494 moved away from the fixed guide rollers 490 to a width greater than the stock width being inserted. With the free end suitably positioned through both sets of jaws 280, 460, the stock straightener assembly 550 is closed and the guide rollers 564 are adjusted toward or away from the rollers 563 so that the strip material S will be suitably straightened as the straightening device 550 is moved along the strip.

With the free end of the blade stock material suitably positioned, the first jaw means 280 are closed to engage the stock and hold it securely against movement longitudinally of itself. The second jaw means, or stock feed clamp 460, is opened and the carriage 450 is moved away from the first jaw means 280 so as to move the stock straightener 550 over the stock. Upon completion of the stock straightening movement, the second jaw means 460 are closed to engage the stock securely and the first jaw means 280 are opened. The stock carriage 450 now holding the stock is moved forward introducing the free end into the passage 852 in the punch and die slide carrier 810, and particularly into the cut-off station 860. With the carriage movement stopped, in response to a command signal, the ram 136 is actuated causing the stock to be sheared and establishing an O position reference on the stock.

To illustrate the operation of the apparatus according to the invention, the description turns now to FIGS. 21 and 36. FIG. 36 is a sequenced diagram representative of operations of the apparatus in successive stages beginning at stage 1 at the lower left in FIG. 36. In this first stage, a free-end E of the strip of blade material is supported cantileverly, as has been described. The outline at stage 1 shows a previous blade having been cut off. The jaw means 280 is actuated to grip the free end and the jaw assembly 460 is opened. The carriage 450 is then moved away from the jaw assembly 280 moving the straightening device 550 along the strip and repositioning the jaw assembly 460 with respect to the strip portion passing therethrough. The jaws 460 are then actuated to grip the intermediate portion of the strip material and the carriage 450 is advanced to the position shown at stage 2 while simultaneously the carrier 810 is traversed to position station A in juxtaposition with the free-end E at stage 2.

Movements of the carriage 450 and the carrier 810 are accomplished substantially simultaneously and at rapid rates of travel. The traversing speed of either or both of the means for position according to the present invention may approach 2,000 inches per minute and a blade of the type being described can be completed in approximately 7 seconds.

With station A in coincidence with the end of the strip at stage 2 the ram 136 is actuated and returned.

The carriage 450 and the free end E are advanced to the position shown in stage 3, while simultaneously the carrier 810 is traversed to bring station C over the strip, the ram 136 is again actuated and returned, producing the hole 114. At stage 4 the free-end E is again advanced and the carrier 810 moved to position station B in suitable juxtaposition to the strip to produce the hole 116. At stage 5 the free-end E is again advanced, movement of the carrier not being required and a second hole 116 is punched by the action of the punch and die set at station B.

In stage 6 the free-end E is again advanced by movement of the carriage 450 and the punch at station C is traversed into suitable location and actuated to produce a second hole 114. At stage 7 the carriage 450 is moved back while the carrier 810 is traversed to bring the punch and die of station F into suitable relation with the free-end of the strip to produce a portion of the notch 121. The free-end is held in position and the carrier 810 is again traversed to bring the punch and die of station I into suitable position to form the radii and thus complete the notch 121, as is shown. It will be apparent that the notch may have any width desired by causing the punch used to be actuated two or more strokes while moving the carriage holding the free-end E a suitable distance in the interval between strokes of the punch.

At stage 8 the free-end is again advanced and the operation of stage 7 repeated. At stage 9 a third notch 121 is produced in this representative blade in like manner.

At stage 10 the free-end is traversed back while simultaneously the carrier 810 is traversed to bring the punch at station L into operative juxtaposition with the free end. It will be recalled that the punches at stations L and M are equipped in the present embodiment to be rotated about axes perpendicular to the plane containing the X and Y axes, all as has been described in connection with the punch and die sets 871 and 872. The punch in the station L is rotated by the operation of the drive means 185 of the *a* axis so as to produce the angled cut seen at stage 10 of FIG. 36.

At stage 11 the free-end is again advanced while the carrier 810 is traversed and while the punch and die set at station L are rotated so as to bring the punch and die set L into suitable relation with the strip to produce the angular notch shown at stage 11.

It will be appreciated that suitable means such as limit switches are provided to insure that punches are fully retracted prior to movement either of the carrier or of the carriage.

At stage 12 the free-end will be advanced and retracted a plurality of times and the carrier traversed to bring the punch shown at station D into working relation to trim the blade to remove the material shown in phantom outline in stage 12.

In stage 13 the free-end is retracted to the position shown whereupon the first jaw means 280 is actuated to grip the free-end in the manner shown at stage 13. The bending device 820, which is traversed along the X axis by the traversing drive means 180, is brought into operating juxtaposition with the end E and the finger 1412 is extended while simultaneously the jaw means 280 is moved to bring the cylinder axis 397 of the nose portion into collinear alignment with axis 1414 of the bender head in the manner previously described herein. Rotation then of the finger 1412 in engagement with the cantileverly supported free-end of the blade bends the end as shown at stage 13 to form a first and upward bend in the blade.

The bending device 820 is moved to clear the bent end of the blade and the jaw means 280 are caused to open and the jaw means 460 again advance placing the strip at stage 14 whereupon the jaw means 280 are again closed, the bending device is traversed into position and the finger 1410 is now extended. The jaw means 280 again adjusted in elevation to place the cylinder axis 395 of the lower jaw 300 in collinear alignment with the rotation axis 1414 of the bending head. Again, the drive means 185 is actuated to rotate the finger of the bending device and to bend the cantileverly supported free-end of the blade downward to form the bend shown at stage 14. The jaw means 280 are thereupon again opened and the second jaw means 460 again advanced to position the blade at stage 15 whereupon the jaw means 280 are again closed and again adjusted to bring the cylinder axis 397 again into coincidence with the axis 1414 of the bending device 820. Again the finger 1412 is extended into engagement with the lower surface of the free-end and the bending head is rotated to form the bend seen in stage 15, whereupon the jaw means 280 is again opened and the strip again advanced through stages 16 and 17 forming an additional downward bend and additional upward bend in the same manner as has been described, whereupon the jaw means 280 are again opened and the now completed blade is advanced to the position shown in stage 18 and the bending device and carrier 810 are again traversed to bring the cut-off of the station A, which in the present embodiment is the cut-off device 860 previously described, into operative relation with the free-end of the strip and actuated by the ram means 136. The now completed blade severed from the strip is dropped through the opening in the press platen to a suitable receptacle and the cycle is ready to be repeated. After each single blade is produced, the quantity displayed is reduced by 1 and the section of tape 1606 is repeated until 0 parts are left to be made, the multiplication factor is then reduced by 1 and the cycle is repeated until the total pre-set quantity is reduced to 0, whereupon the tape containing the program goes automatically to the next type of part. In the sequence for making a blade, the free end of stock carried in the carriage 450 of the Y axis component is moved to position the free end E at a predetermined position in response to a command signal from the control unit 1600. Also in response to a command signal from the control unit the carrier 810 is moved into a position which places a preselected punch and die set into a predetermined position with respect to the free end of the stock. Both the carriage and the carrier are driven to their respective predetermined positions very rapidly and are positively decelerated, as has been described hereinabove, to a 0 or null position corresponding to the coordinates dictated by dial input 1660 or by the information in the numerical control tape 1606. When actual position and command position coincide, an electrical null is communicated to the programmer 1688 and the actuating means, in particular the ram 136, is actuated to stroke the punch through the material into its mating die button. Conventional safety switches may be used to prevent the ram from cycling except when the proper position is assured. The ram having completed its cycle, down and up, and the punch of the punch and die set likewise having returned to its up, or home, position, the cycle is repeated to achieve the desired number of notches, holes, and the like, required by the program. Repeated strokes may be made so as to nibble material from the free end of the stock.

The apparatus provides further for manual input of an amount of over-bend to compensate for springback. The desired over-bend addition to the programmed command signals from the tape are applied in the plurality of bend-offset switches 1692 which may be pre-set by the operator. In response to command signals received from the tape reader, the drive means 175 moves the bending device into suitable position while the bend finger and jaw actuating means 190 extend the bending finger appropriate to the desired direction of bend and the elevator means 400 positions the first jaw means 280 so that the center of the desired bend radius normally will coincide with the rotation axis of the bending device. For larger radii, when the finger has been extended to the predetermined position determined by the command signal as modified by the thickness setting and the first jaw means have been elevated to the appropriate position, an electrical null is communicated to the control circuit 1600 whereupon the bending device rotation drive 185 is actuated in response to a command signal to rotate the finger in the appropriate direction and amount to bend a portion of the free end of the stock. As the actual bend angle position approaches the command position an electrical null is communicated to the control circuit 1600, whereupon the bending device rotational motion is reversed and the bender head is rotated back to its 0 or home position. The bending jaws are opened and the stock free end is moved forward into the preselected position for the next successive bend to be made and the steps are repeated to produce a second bend.

When the particular blade has been completely shaped by punching and by bending, the free end is again fed forward in response to a command signal and the carrier is traversed to position the cut-off station over the stock, the completed blade extending beyond the cut-off line, as before, when the null positions are signalled, indicating that both carriage and carrier are in the commanded position, the ram is actuated to move the cut-off knife and the finished blade is cut off and dropped into the delivery chute. If desired, the cut-off knife may again be actuated to trim the succeeding free end. The cycle is then repeated automatically to produce the number of blades called for in the numerical control tape as modified by the input at the blade multiplier selector.

Following the cut-off of a completed blade, the first clamp jaw means are again moved to hold the stock; the second jaw means or stock-feed jaws are opened and the stock positioner carriage is again moved away from the first jaws, moving the straightener assembly over the stock extending from the reel. A short length of stock is tensioned and straightened and levelled as each blade is completed and before a succeeding blade is begun.

The tape spooler provides for the tape to be recycled for each blade so that a single program is repeatedly used until the desired quantity is attained, whereupon the tape is spooled forward to bring a program for a succeeding blade into operative relation with the tape reader.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for making blades for use in tire molds comprising jaw means for cantileverly supporting a free end of blade strip material, said jaw means having a jaw terminating in a cylindrical surface having a cylinder axis disposed transversely of and spaced from said strip, a strip bending device having a finger engageable with a surface of said free end and rotatable about a rotation axis, elevator means connected to said jaw means to move said jaw means transversely with respect to said rotation axis, means for moving said finger transversely with respect to said rotation axis, and driving means connected to move both said elevator means and said means for moving said finger to bring said cylinder axis and said rotation axis into collinear relation and said finger into surface engagement with said free end.

2. Apparatus as claimed in claim 1 comprising further, a rotatable punch and die set, means for positioning said device and said rotatable set alternatively into juxtaposition with said free end, driving means connecting with said device and with said punch and die set for positive corotational relation therebetween, whereby a single control axis is enabled to control movement of both said punch and die set and said bending device.

3. Apparatus as claimed in claim 1, comprising a tool carrier mounted for movement transversely with respect to said free end, a punch assembly including a punch having a non-circular cutting edge outline and carried by said carrier for rotation about an axis generally perpendicular to the plane of said material, a die assembly including a die button having a cutting edge outline conjugate with said punch outline and carried by said carrier for rotation about an axis collinear with the first said axis, and gear means spaced away from said axes connecting said punch assembly and said die assembly, whereby rotation of one of said punch and said button is positively communicated to the other.

4. Apparatus as claimed in claim 1 further comprising means for positioning said free end of blade strip along a first axis, means for positioning a tool along a second axis into shape altering engagement with said end, and position sensing means operatively connected to at least one of said means for positioning and capable of emitting a signal which is uniquely representative of any actual single position of said one means, whereby the time used in communicating said signal is reduced to a substantially constant minimum.

5. Apparatus as claimed in claim 1, comprising said jaw means supporting said free end in operative relation to said device and including a first jaw having a strip material engaging surface, a second jaw having a strip material engaging surface movable toward and away from the first said surface, a wedge disposed to move one of said jaws toward the other and said wedge itself being movable transversely of the movement of said one of said jaws, clamping means operative to move said wedge, and means for communicating command signals connected to said clamping means to effect operation thereof in response to said command signals.

6. Apparatus as claimed in claim 5, further comprising means for varying the limit of movement of said wedge whereby the movement of the second said surface away from the first said surface and the distance therebetween can be controlled.

7. Apparatus as claimed in claim 1, further comprising an electrical circuit including a potentiometer adapted to register a thickness of said strip material, said circuit being connected to energize said drive means in response to a command signal and to produce an electrical null to stop said driving means in response to the thickness of material registered in said potentiometer.

8. Apparatus as claimed in claim 1, said elevator means including cam means having a first portion operable to effect a first displacement of said jaw means and a second portion operable to effect a second displacement in a direction opposite said first displacement, at least one said displacement being effected at a variable rate.

9. Apparatus as claimed in claim 8, further comprising holding means operable selectively to increase and to decrease cam contact force within said cam means.

* * * * *

UNITED STATES PATENT OFFICE
CERTIFICATE OF CORRECTION

Patent No. 3,696,655      Dated October 10, 1972

Inventor(s) William L. Hinks and Harry L. Hosterman

It is certified that error appears in the above-identified patent and that said Letters Patent are hereby corrected as shown below:

In the Abstract, the second paragraph has been omitted, as follows:

"The foregoing abstract is not to be taken as limiting the invention of this application, and in order to understand the full nature and extent of the technical disclosure of this application, reference must be made to the accompanying drawings and the following detailed description."

Col. 17, line 43, "s" should be -- is --.

Col. 29, line 51, after "guide rollers" -- 494 adjusted suitably. The straightening rollers -- has been omitted.

Signed and sealed this 24th day of April 1973.

(SEAL)
Attest:

EDWARD M. FLETCHER, JR.
Attesting Officer

ROBERT GOTTSCHALK
Commissioner of Patents.